United States Patent
Li et al.

(10) Patent No.: US 8,432,786 B2
(45) Date of Patent: *Apr. 30, 2013

(54) CONTROL CHANNEL DESIGN TO SUPPORT ONE-TO-ONE, MANY-TO-ONE, AND ONE-TO-MANY PEER-TO-PEER COMMUNICATIONS

(75) Inventors: Junyi Li, Bedminster, NJ (US); Rajiv Laroia, Far Hills, NJ (US); Saurabh Tavildar, Jersey City, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 752 days.

This patent is subject to a terminal disclaimer.

(21) Appl. No.: 12/169,080

(22) Filed: Jul. 8, 2008

(65) Prior Publication Data

US 2009/0016295 A1    Jan. 15, 2009

Related U.S. Application Data

(60) Provisional application No. 60/948,988, filed on Jul. 10, 2007.

(51) Int. Cl.
*H04J 11/00* (2006.01)
(52) U.S. Cl.
USPC .......................................... 370/208; 370/252
(58) Field of Classification Search .................. 370/208, 370/294, 449, 229–236, 310, 395.4
See application file for complete search history.

(56) References Cited

U.S. PATENT DOCUMENTS

| 6,728,232 B2 | 4/2004 | Hasty, Jr. et al. |
| 7,088,688 B2 | 8/2006 | Kim et al. |
| 7,283,832 B2 | 10/2007 | Jia et al. |

(Continued)

FOREIGN PATENT DOCUMENTS

| JP | 2005323375 | 11/2005 |
| JP | 2006500882 | 1/2006 |

(Continued)

OTHER PUBLICATIONS

International Search Report and Written Opinion—PCT/US2008/069548, International Search Authority—European Patent Office—Jan. 12, 2009.

(Continued)

*Primary Examiner* — Gary Mui
(74) *Attorney, Agent, or Firm* — James K. O'Hare

(57) ABSTRACT

A protocol is provided that facilitates downlink concurrent peer-to-peer communications (within a time slot or traffic slot) between one device and many terminals as well as uplink concurrent peer-to-peer communications (within a time slot or traffic slot) between a plurality of terminals and one device. The concurrent peer-to-peer communications may take place within an ad hoc network of devices. To facilitate such operation, a time-frequency structure is provided within a control channel that allows the device and terminals to identify the peer-to-peer connections. This time-frequency structure also allows terminals to identify other sibling terminals that have a connection with the same device, thereby allowing to more efficiently performing interference mitigation. That is, sibling peer-to-peer connections with the same device may be treated different from other non-related peer-to-peer connects for purposes of interference mitigation in a wireless network.

40 Claims, 16 Drawing Sheets

U.S. PATENT DOCUMENTS

| | | | |
|---|---|---|---|
| 7,702,336 B2 | 4/2010 | Sousa et al. | |
| 7,876,701 B2 | 1/2011 | Li et al. | |
| 2003/0227934 A1* | 12/2003 | White et al. | 370/432 |
| 2004/0110508 A1 | 6/2004 | Haartsen | |
| 2005/0018754 A1 | 1/2005 | Song | |
| 2005/0111462 A1* | 5/2005 | Walton et al. | 370/395.4 |
| 2005/0135284 A1* | 6/2005 | Nanda et al. | 370/294 |
| 2005/0190784 A1 | 9/2005 | Stine | |
| 2006/0166688 A1 | 7/2006 | Sun et al. | |
| 2006/0258383 A1 | 11/2006 | Jiang et al. | |
| 2007/0086341 A1* | 4/2007 | Ye | 370/230 |
| 2007/0099632 A1 | 5/2007 | Choksi | |
| 2007/0105576 A1 | 5/2007 | Gupta et al. | |
| 2007/0133483 A1* | 6/2007 | Lee et al. | 370/338 |
| 2008/0273490 A1 | 11/2008 | Sayana et al. | |
| 2009/0040985 A1 | 2/2009 | Barnawi et al. | |
| 2009/0296591 A1 | 12/2009 | Urabe et al. | |
| 2009/0316657 A1 | 12/2009 | Singh et al. | |
| 2009/0328117 A1 | 12/2009 | Morris et al. | |

FOREIGN PATENT DOCUMENTS

| | | |
|---|---|---|
| JP | 2006094229 | 4/2006 |
| JP | 2009044200 A | 2/2009 |
| JP | 2009514441 | 4/2009 |
| TW | I256203 | 6/2006 |
| WO | WO2005117464 | 12/2005 |
| WO | WO2006132328 A1 | 12/2006 |
| WO | WO2007051130 | 5/2007 |
| WO | WO2007051140 | 5/2007 |
| WO | WO2007061014 A1 | 5/2007 |

OTHER PUBLICATIONS

Kulkarni G; Raghunathan V; Srivastava M B; Gerla M: "Channel allocation in OFDMA based wireless ad hoc networks" Advanced Signal Processing Algorithms, Architectures, and Implementations XII, Proceedings of The SPIE—The International Society for Optical Engineering, vol. 4791, Jul. 9-11, 2002 pp. 252-261, XP002508561.

Wang et al: "Joint scheduling and power control supporting multicasting in wireless ad hoc networks" AD HOC Networks, Elsevier, vol. 4, No. 4, Jul. 1, 2006, pp. 532-546, XP005402238 ISSN: 1570-8705 equation (1) p. 534, left-hand column, paragraph 2.

Stefano Avallone et al ,"A Channel Assignment Algorithm for Multi-Radio Wireless Mesh Networks", IEEE, 2007.

* cited by examiner

CONTROL CHANNEL DESIGN TO SUPPORT ONE-TO-ONE, MANY-TO-ONE, AND ONE-TO-MANY PEER-TO-PEER COMMUNICATIONS

CLAIM OF PRIORITY UNDER 35 U.S.C. §119

The present Application for Patent claims priority to U.S. Provisional Application No. 60/948,988 entitled "Methods and Apparatus for a Control Channel" filed Jul. 10, 2007, and assigned to the assignee hereof and hereby expressly incorporated by reference herein.

BACKGROUND

1. Field

The following description generally relates to wireless communications and, in particular, to a control channel for a peer-to-peer network that supports both one-to-one, many-to-one, and one-to-many peer-to-peer communications.

2. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Wireless communication systems leverage various portions of wireless spectrum for transferring data. However, wireless spectrum is an expensive and valuable resource. For example, significant costs may be incurred by a company desiring to operate a wireless communication system over a portion of the wireless spectrum (e.g., within the licensed spectrum). Further, conventional techniques typically provide inefficient utilization of wireless spectrum. According to a common illustration, the spectrum allocated for wide area network cellular communication oftentimes is not uniformly utilized across time and space; thus a significant subset of spectrum may be unused in a given geographic location in a given time interval.

According to another example, wireless communication systems often times employ peer-to-peer or ad hoc architectures whereby a wireless terminal may transfer signals directly to another wireless terminal. As such, signals need not traverse through a base station; rather, wireless terminals within range of each other may discover and/or communicate directly. However, conventional peer-to-peer networks typically operate in an asynchronous manner whereby peers may effectuate differing tasks at a particular time. Consequently, peers may encounter difficulty associated with identifying and/or communicating with disparate peers within range. Additional difficulties are encountered when implementing one-to-many and many-to-one communications over a peer-peer network.

Therefore, a way is needed to facilitate peer-to-peer communications over a shared frequency spectrum.

SUMMARY

The following presents a simplified summary of one or more embodiments in order to provide a basic understanding of some embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A protocol is provided that facilitates downlink concurrent peer-to-peer communications (within a time slot or traffic slot) between one device and many terminals as well as uplink concurrent peer-to-peer communications (within a time slot or traffic slot) between a plurality of terminals and one device. The concurrent peer-to-peer communications may take place within an ad hoc network of devices. To facilitate such operation, a time-frequency structure is provided within a control channel that allows the device and terminals to identify the peer-to-peer connections. This time-frequency structure also allows terminals to identify other sibling terminals that have a connection with the same device, thereby allowing to more efficiently performing interference mitigation. That is, sibling peer-to-peer connections with the same device may be treated different from other non-related peer-to-peer connects for purposes of interference mitigation in a wireless network.

According to a first aspect, a first device is provided for facilitating communications with a plurality of devices including a second device and a third device within a peer-to-peer network, where the first device having a first connection with the second device and a second connection with the third device. The first device sends a first transmission request signal in a connection scheduling channel slot, where the first transmission request signal indicating that the first device intends to transmit a traffic signal to the second device in a subsequent traffic channel slot. Similarly, the first device may send a second transmission request signal in the connection scheduling channel slot, the second transmission request signal indicating that the first device intends to transmit a traffic signal to the third device in the subsequent traffic channel slot. The connection scheduling channel slot may include a plurality of OFDM symbols, each of the plurality of OFDM symbols including a plurality of tones.

The first transmission request signal may be transmitted in a tone in one of the plurality of OFDM symbols and the second transmission request signal is transmitted in a tone in one of the plurality of OFDM symbols. Additionally, the OFDM symbol in which the first transmission request signal is transmitted may be the same as the OFDM symbol in which the second transmission request signal is transmitted.

The first device may also monitor (a traffic management channel) to receive request response signals from the second and from the third device, the request response signals indicating that the corresponding devices are ready to receive traffic from the first device. If a request response signal is received from at least one of the second and third devices, the first device may determine to transmit a pilot signal. The first device may also monitor (the traffic management channel) to receive additional request response signals, the additional request responses indicating that the corresponding devices are ready to receive traffic from devices other than the first device. The first device may then calculate an interference cost to the connections associated with the additional request response signals as a function of the received power of the additional request response signals. The first device may then determine to transmit a pilot signal if the calculated interference cost is less than or equal to a threshold.

The first device may then transmit the pilot signal to both the second and third devices. In response, the first device may receive rate report signals from the second and third devices.

The first device may then determine whether to transmit a first and a second traffic signal components to the second and third devices, wherein the transmission rates and powers of the first and second traffic signal components are determined as a function of the received rate report signals. The first device then transmits the first and second traffic signal components and an in-band control signal in the subsequent traffic channel slot, the in-band control signal including information indicative of the transmission rates.

The subsequent traffic channel slot includes a plurality of OFDM symbols, each of the plurality of OFDM symbols including a plurality of tones. The first and second traffic signal components may be transmitted in two disjoint (separate or distinct) subsets of a plurality of tone-symbols within the traffic channel slot, each of the plurality of tone-symbols being a tone in one OFDM symbol. In various implementations, the two subsets overlap substantially in time or they may be non-overlapping in time.

The in-band control signal may include information indicating that the first and the second traffic signal components are transmitted using the two subsets and assignment information of which one of the two subsets is used for which one of the first and the second connections. In one example, the first traffic signal component may be superposed on the second traffic signal component to form the traffic signal transmitted in the traffic channel slot.

The various features describe herein may be implemented within a device (such as a router), a circuit or processor incorporated in a device, and/or a software.

According to a second aspect, a second device is provided for facilitating communications with a first device within a peer-to-peer network, the first device having a first connection with the second device and a second connection with a third device. The second device may monitor (a traffic management channel) to receive an intended transmission request signal from the first device in a connection scheduling channel slot, the intended transmission request signal indicating that the first device intends to transmit a traffic signal to the second device in a subsequent traffic channel slot. Similarly, the second device may also monitor (the traffic management channel) to receive additional transmission request signals from transmitter devices in the connection scheduling channel slot, the additional transmission request signal indicating that the transmitter devices intend to transmit traffic signals to receiver devices other than the second device in the subsequent traffic channel slot. The second device may then calculate a signal-to-interference ratio, the signal-to-interference ratio being the ratio of a predicted signal power to a predicted interference power, where the predicted signal power may be determined as a function of the received power of the transmission request signal from the first device, and the predicted interference power may be determined as a function of the received powers of the additional transmission request signals. The second device may then determine whether to transmit a request response signal to the first device if the signal-to-interference ratio is greater than or equal to a threshold.

The second device may then identify one of the additional transmission request signals as a sibling transmission request signal, the sibling transmission request signal being a request from the first device to the third device. Consequently, the second device may exclude the received power of the identified sibling transmission request signal in the calculation of the predicted interference power.

The connection scheduling channel slot may include a plurality of OFDM symbols, each of the plurality of OFDM symbols including a plurality of tones, where the intended transmission request signal is transmitted in a tone in one of the plurality of OFDM symbol and the sibling transmission request signal is transmitted in a tone in one of the plurality of OFDM symbol. The OFDM symbol in which the intended transmission request signal is transmitted is the same as the OFDM symbol in which the sibling transmission request signal is transmitted. The tone in which the sibling transmission request signal is transmitted may be known to the second device.

The second device may further transmit the request response signal, where the request response signal is transmitted in a tone in one of the plurality of OFDM symbol.

In response to the request response signal, the second device may receive a pilot from the first devices and calculates the signal-to-interference ratio of the pilot. The second device may then determine a maximum traffic transmission rate as a function of the calculated signal-to-interference ratio of the pilot, where the maximum traffic transmission rate may be the maximum rate the second device can reliably receive given the calculated signal-to-interference ratio of the pilot. A rate report signal is then transmitted by the second device to the first device, where the rate report signal may include information indicative of the determined maximum traffic transmission rate.

The second device signal may subsequently receive a traffic signal from the first devices, where the traffic signal includes an in-band control signal. From the in-band control signal, the second device may determine whether the traffic signal includes a traffic signal component targeted to the second device. If it is determined that there is one, the second device may decode the traffic signal component targeted to the second device.

In one example, the in-band control signal may include information indicating that the traffic channel slot is partitioned into at least two disjoint subsets of a plurality of tone-symbols within the traffic channel slot, each of the plurality of tone-symbols being a tone in one OFDM symbol, and the assignment information of which one of the at least two disjoint subsets is assigned to transmit the traffic signal component targeted to the second device. The second device may retrieve modulation symbols from the assigned subset of tone-symbols and decodes the traffic signal component targeted to the second device from the retrieved modulation symbols.

The various features describe herein may be implemented within a wireless terminal, a circuit or processor incorporated in a wireless device, and/or a software.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
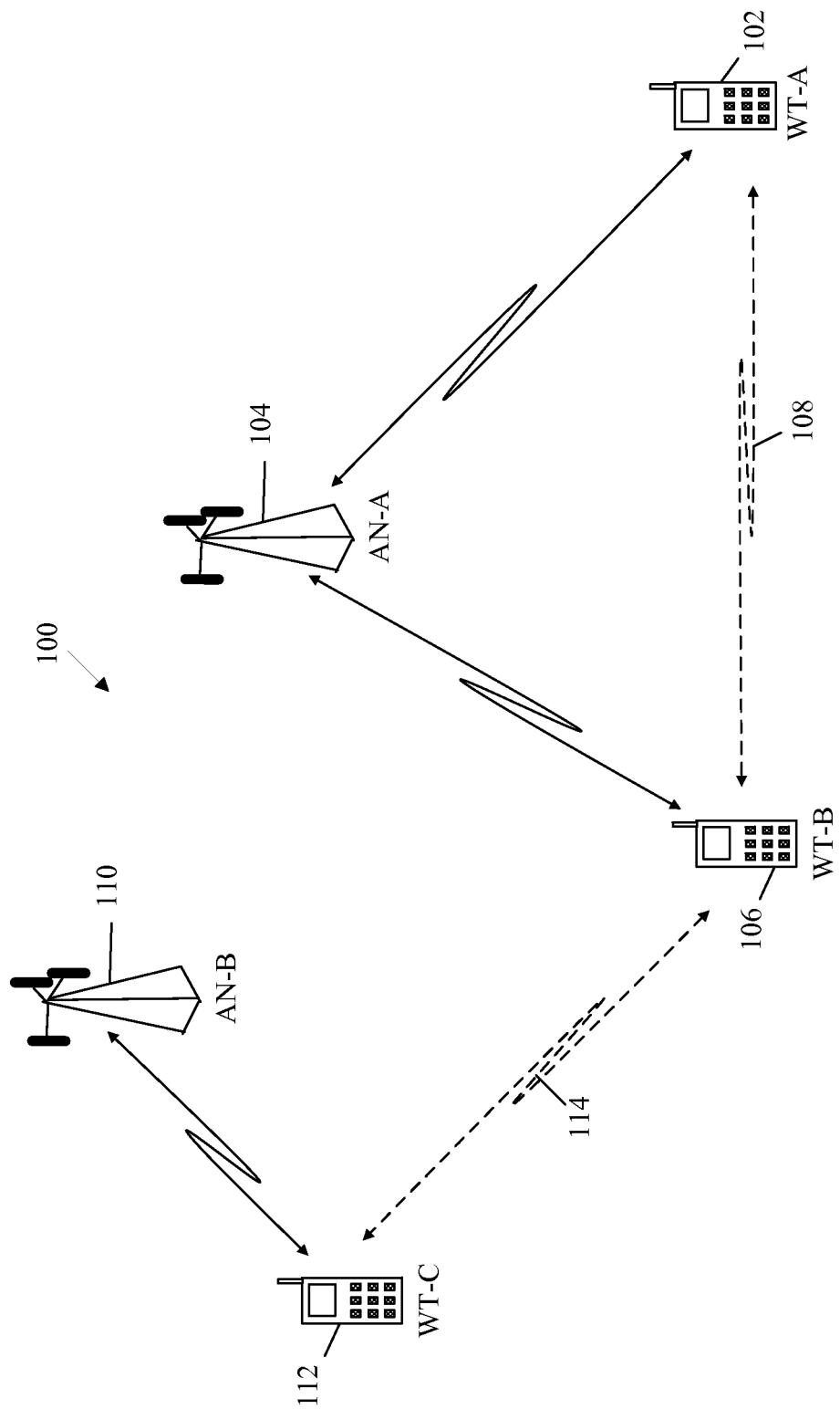
FIG. 1 is a block diagram illustrating the how an ad hoc peer-to-peer network may be implemented in conjunction with a wide area network.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Overview

A control channel architecture is provided that supports peer-to-peer signaling for one-to-one, one-to-many, and many-to-one over a shared frequency spectrum. A time-frequency structure within a control channel is used by transmitter/receiver pairs to signal a request and response to transmit traffic on a particular traffic time slot. The time-frequency structure is defined by a plurality of tones and symbols, where a subset of tones within a symbol (e.g., orthogonal frequency division multiplexing (OFDM) symbol) serves to identify a particular peer-to-peer connection. To further support one-to-many and many-to-one within the peer-to-peer network a protocol is defined whereby a particular device can use a contiguous set of tones and symbols within the time-frequency structure to identify its peer-to-peer connections to a plurality of peer devices. Such allocation of contiguous tone-symbols to one-to-many peer-to-peer connections may be indicated to peer devices via a paging channel or may be known by implication if the selected contiguous tone-symbols are reserved for this purpose within the protocol. For such one-to-many peer-to-peer connections, an individual terminal that is one of the "many" devices being served by the one-to-many peer-to-peer connections can ignore interference management for other terminals that are also part of the "many" devices being served by the one-to-many peer-to-peer connection.

To accomplish the foregoing and related ends, one or more embodiments are provided that comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

Ad Hoc Communication System

An ad hoc peer-to-peer wireless network may be established among two or more terminals without intervention of a centralized network controller. In some examples, the wireless network may operate within a frequency spectrum shared among a plurality of wireless terminals.

FIG. 1 is a block diagram illustrating the how an ad hoc peer-to-peer network may be implemented, e.g., in conjunction a wide area network. In some examples, the peer-to-peer network and the wide area network may share the same frequency spectrum. In other examples, the peer-to-peer network is operated at a different frequency spectrum, e.g., a spectrum dedicated to the use of the peer-to-peer network. A communication system 100 may comprise one or more wireless terminals WT-A 102, WT-B 106, and WT-C 112. Although just three wireless terminals WT-A 102, WT-B 106, and WT-C 112 are depicted, it is to be appreciated that communication system 100 may include any number of wireless terminals. The wireless terminals WT-A 102, WT-B 106, and WT-C 112 can be, for example, cellular phones, smart phones, laptops, handheld communication devices, handheld computing devices, satellite radios, global positioning systems, PDAs, and/or any other suitable device for communicating over wireless communication system 100.

According to one example, the communication system 100 may support a wide area network (WAN) which may include one or more access nodes AN-A 104 and AN-B 110 (e.g., base station, access point, etc.) and/or any number of disparate access nodes (not shown) in one or more sectors/cells/regions that receive, transmit, repeat, etc., wireless communication signals to each other and/or to the one or more wireless terminals WT-A 102, WT-B 106, and WT-C 112. Each access node AN-A 104 and AN-B 110 may comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. According to an optional feature, when communicating through the WAN, the wireless terminal(s) may transmit signals to and/or receive signals from an access node when communicating via the wide area infra-structure network supported by the communication system 100. For instance, wireless terminals WT-A 102 and WT-B 106 may communicate with the network via access node AN-A 104 while wireless terminal WT-C 112 may communication with a different access node AN-B 110.

The wireless terminals may also communicate directly with each other via a local area peer-to-peer (P2P) network (e.g., ad hoc network). Peer-to-peer communications may be effectuated by directly transferring signals between wireless terminals. Thus, the signals need not traverse through an access node (e.g., a base station) or centrally managed network. The peer-to-peer network may provide short range, high data rate communication (e.g., within a home, office, etc. type setting). For example, wireless terminals WT-A 102 and WT-B 106 may establish a first peer-to-peer network 108 and wireless terminals WT-B 106 and WT-C 112 may also establish a second peer-to-peer network 114.

Additionally, each peer-to-peer network connection 108 and 114 may include wireless terminals within a similar geographic area (e.g., within range of one another). However, it is to be appreciated that wireless terminals need not be associated with the same sector and/or cell to be included in a common peer-to-peer network. Further, peer-to-peer networks may overlap such that one peer-to-peer network may take place within a region that overlaps or is encompassed with another larger peer-to-peer network. Additionally, a wireless terminal may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Peer-to-peer communications between the wireless terminals may be synchronous. For example, wireless terminals WT-A 102 and WT-B 106 may utilize a common clock reference to synchronize performance of distinct functions. The wireless terminals WT-A 102 and WT-B 106 may obtain timing signals from the access node AN-A 104. The wireless terminals WT-A 102 and WT-B 106 may also obtain timing signals from other sources, for instance, GPS satellites or television broadcast stations. According to an example, time may be meaningfully partitioned in a peer-to-peer network for functions such as peer discovery, paging, and traffic. Further, it is contemplated that each peer-to-peer network may set its own time.

Before communication of traffic in a peer-to-peer connection can take place, the two peer wireless terminals may detect and identity each other. The process by which this mutual detection and identification between peers takes place may be referred to as peer discovery. The communication system 100 may support peer discovery by providing that peers, desiring to establish peer-to-peer communications, periodically transmit short messages and listen to the transmissions of others. For example, the wireless terminals WT-A 102 (e.g., transmitting wireless terminal) may periodically broadcast or send signals to the other wireless terminal(s) WT-B 106 (e.g., receiving wireless terminal(s)). This allows the receiving wireless terminal WT-B 106 to identify the sending wireless terminal WT-A 102 when the receiving wireless terminal WT-B 106 is in vicinity of the sending wireless terminal WT-A 102. After identification, an active peer-to-peer connection 108 may be established.

Transmissions for peer discovery may periodically occur during specified times referred to as peer discovery intervals, the timing of which may be predetermined by a protocol and known to the wireless terminals WT-A 102 and WT-B 106. Wireless terminals WT-A 102 and WT-B 106 may each transmit respective signals to identify themselves. For example, each wireless terminal WT-A 102 and WT-B 106 may send a signal during a portion of a peer discovery interval. Further, each wireless terminal WT-A 102 and WT-B 106 may monitor signals potentially transmitted by other wireless terminals in a remainder of the peer discovery interval. According to an example, the signal may be a beacon signal. By way of another illustration, the peer discovery interval may include a number of symbols (e.g., OFDM symbols). Each wireless terminal WT-A 102 may select at least one symbol in the peer discovery interval for transmission by that wireless terminal WT-A 102. Moreover, each wireless terminal WT-A 102 may transmit a corresponding signal in one tone in the symbol selected by that wireless terminal WT-A 102.

The local area peer-to-peer network and the wide area network may share a common wireless spectrum to effectuate communication; thus, bandwidth may be shared for transferring data via the disparate types of networks. For example, the peer-to-peer network and the wide area network may both communicate over the licensed spectrum. However, the peer-to-peer communication need not utilize the wide area network infrastructure.

After wireless terminals discover each other, they may proceed to establish connections. In some examples, a connection links two wireless terminals, e.g., in FIG. 1 connection 108 links wireless terminals WT-A and WT-B. Terminal WT-A 102 can then transmit traffic to terminal WT-B 106 using connection 108. Terminal WT-B 106 can also transmit traffic to terminal WT-A 102 using connection 108.

Figure 2:
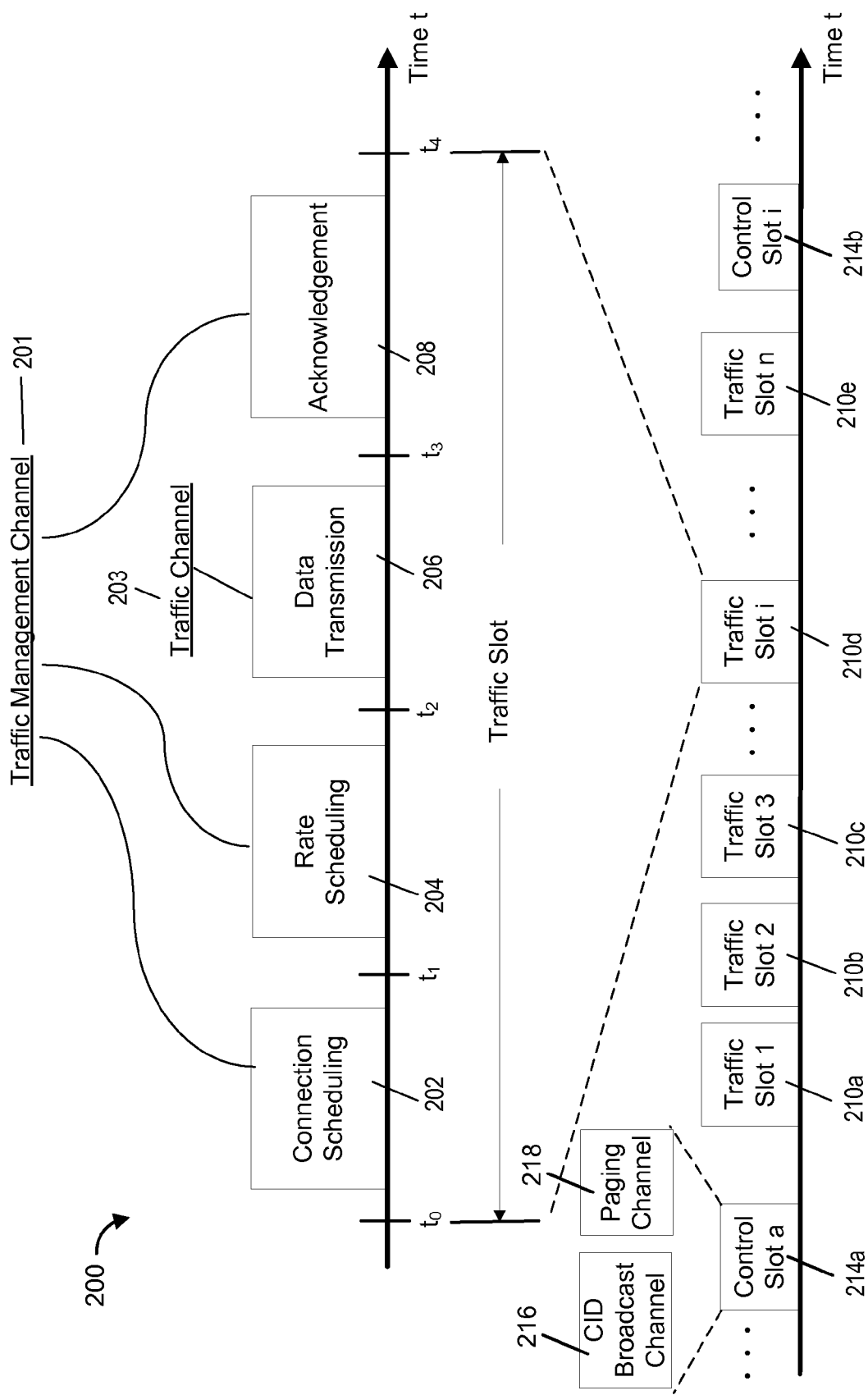
FIG. 2 illustrates one example of a timing sequence for a traffic channel slot that may be used by wireless terminals to transport traffic after a peer-to-peer communication connection has been established between wireless terminals.

FIG. 2 illustrates one example of a timing sequence for a traffic channel slot that may be used by wireless terminals to transport traffic after a peer-to-peer communication connection has been established between wireless terminals. Each traffic channel slot 210 may include a traffic management channel 201 and a traffic channel 203. The traffic management channel 201 may be used for signaling (e.g., scheduling and interference management) related to traffic data transmissions in the traffic channel 206. A connection scheduling segment 202, a rate scheduling segment 204, and an acknowledgment segment 208 are collectively referred to as the traffic management channel 201. A data transmission segment 206 may be referred to as the traffic channel 203. The connection scheduling segment 202, the rate scheduling segment 204, the data segment 206 and the acknowledgment 208 shown in FIG. 2 comprise a traffic slot.

The connection scheduling segment 202 may be used by a transmitter terminal to indicate to its receiver terminal (in a peer-to-peer connection) to indicate that it is ready to transmit traffic data. The rate scheduling segment 204 allows the transmitter/receiver terminals (in the peer-to-peer connection) to obtain a transmission rate and/or power to use in transmitting the traffic data. The data transmission segment 206 is then used to transmit the desired traffic data at the obtained transmission rate and/or power. The acknowledgement segment 208 may be used by the receiver terminal to indicate that the traffic data was received or not received in the data transmission segment 206. In one example, the time duration of a traffic slot is approximately two (2) milliseconds. As the traffic slots 210 repeat over time, the time sequence structure shown in FIG. 2 shows one period of the traffic slots. Note that, prior to sending traffic data in the traffic slot 210, the transmitter and receiver terminals may have established a peer-to-peer connection via a control slot 214.

A control slot 214 in inserted every so often between traffic slots. Traffic slots 210 are time intervals during which a transmitter terminal may send peer-to-peer traffic data to a receiver terminal through the transmission channel. Each control slot 214 may include a CID Broadcast Channel 216 and a Paging Channel 218. The control slot 214 may occur at much longer intervals than traffic slots. For instance, the control slot 214 may occur every second or so. A control slot 214 may serve to establish and maintain a peer-to-peer connection between the transmitter and receiver terminals. The CID Broadcast Channel 216 may be used to indicate those peer-to-peer connection identifiers (CIDs) that are in use by nearby connections and to indicate whether a peer-to-peer connection is still alive. For example, the transmitter and receiver terminals may monitor the CID Broadcast Channel 216 to determine which CIDs are in use. The Paging Channel 218 is used by the transmitter and receiver terminals to establish new CIDs for a new peer-to-peer connection and may include a Paging Request Channel and a Paging Response Channel. The control slots 214 may occur at much longer intervals than traffic slots 212. For instance, the control slots 214 may occur every second or so.

Collision Mitigation Using Transmission CIDs

In an ad hoc peer-to-peer communication system, multiple communications may take place using frequency spectrum resources shared in both space and time. Because of the distributed nature of the ad hoc peer-to-peer network, it may not always be possible to control the channel allocations (e.g., slots) used for transmissions between the wireless terminals. In wireless networks where a central authority does not exist, interference avoidance and/or management is a key feature to maintain the efficiency of the network performance.

Figure 3:
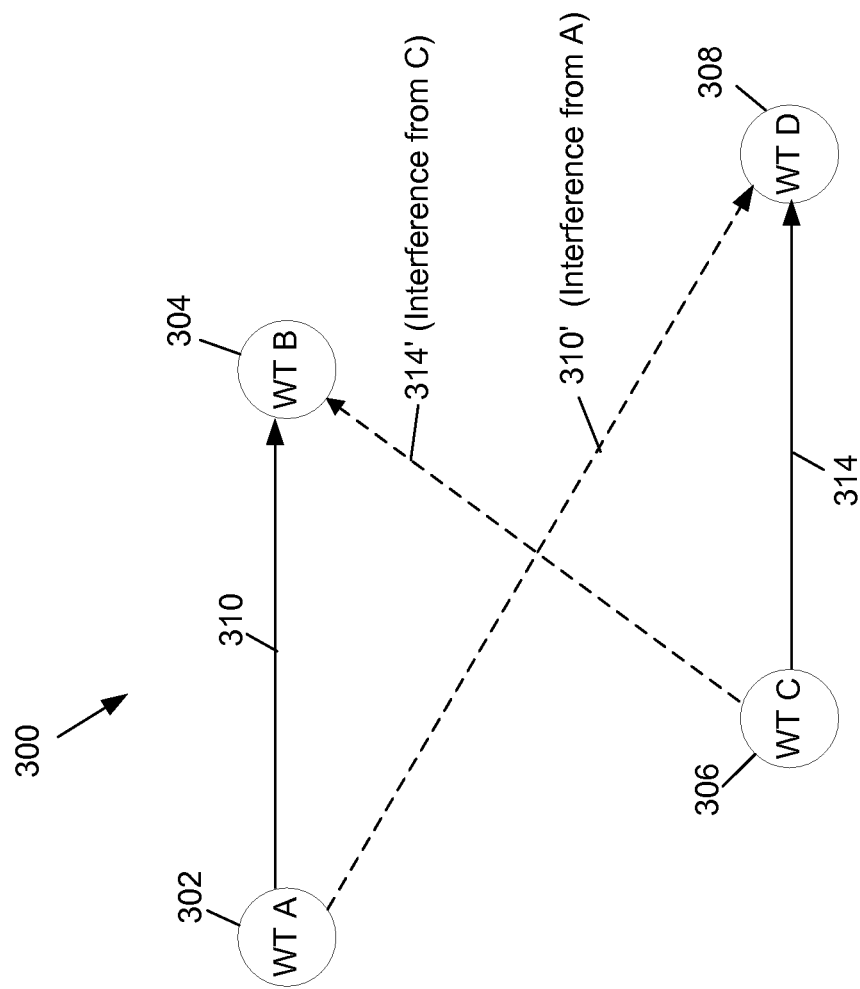
FIG. 3 is a block diagram illustrating an environment in which a plurality of wireless terminals may establish peer-to-peer communication connections that may cause interference to other nearby wireless terminals.

FIG. 3 is a block diagram illustrating an environment in which a plurality of wireless terminals may establish peer-to-peer communication connections that may cause interference to other nearby wireless terminals. In this example, the wireless terminals use one-to-one peer-to-peer connections. A peer-to-peer network 300 may include a plurality of wireless terminals that may share and/or concurrently use a frequency spectrum. The shared frequency spectrum may include one or more transmission and/or control channels, with each transmission (traffic) channel having a corresponding traffic management channel. In one example, the traffic management channel may be used to send a traffic request for communications over a corresponding transmission (traffic) channel.

In one example, a first wireless terminal WT A 302 may be attempting to transmit 310 to a second wireless terminal WT B 304 while a third wireless terminal WT C 306 is concurrently attempting to transmit 314 to a fourth wireless terminal WT D 308 using the same traffic channel bandwidth resource. The first wireless terminal WT A 302 may be referred to as the intended transmitter, the second wireless terminal WT B 304 may be referred to as the intended receiver, and the third wireless terminal WT C 306 may be considered the interferer. In this peer-to-peer network 300, a transmission and control channel pair may be shared by the plurality of the wireless terminals WT A, WT B, WT C, and WT D. However, because such transmission (traffic) and/or control channel is shared (e.g., frequency spectrum sharing) by the wireless terminals, it may also result in unwanted interference 314' and 310' among the wireless terminals. For instance, if both transmissions 310 and 314 actually take place, then the signal 314' from the third wireless terminal WT C 306 may be seen as interference to the second wireless terminal WT B 304 receiver and may degrade its ability to successfully recover the desired signal 310 from the first wireless terminal WT A 302. Therefore, certain interference management protocol is needed to manage interference from the third wireless terminal WT C 306 to the second wireless terminal WT B 304. One goal of the interference management protocol is to allow the third wireless terminal WT C 306 to transmit without creating excessive interference to the second wireless terminal WT B 304, thereby increasing the overall throughput and improving the system performance. Note that in the meantime, the first wireless terminal WT A 302 may also cause interference 310' to the fourth wireless terminal WT D 308, and a similar interference management protocol may also be used to control that interference.

Because there is no centralized traffic management authority, there is a chance that WT A 302 and WT C 306 may transmit on the same or overlapping channel, thereby causing interference with each other. For example, by coincidence, both WT A 302 and WT C 306 may use the same transmission CID. A transmission CID may be used to indicate a particular transmission channel (e.g., frequency or time slot) to a receiving terminal WT B 304 and 308. Consequently, when the same transmission CID is used by two terminals, they may also be concurrently transmitting on the same channel or overlapping channels. If both transmitting terminals WT A 302 and WT C 306 are within range of the receiver terminals WT B 304 and/or WT D 308, then the receiver terminals WT B 304 and/or WT D 308 may perceive interference.

According to one implementation, transmitter and/or receiver yielding may be implemented by devices in a peer-to-peer network that allows a device to backoff if it is likely to cause interference to other nearby devices of higher priority. Consequently, if the first connection 310 between the first device WT A 302 and second device WT B 304 has a higher priority than the second connection 314 between the third device WT C 306 and the fourth device WT D 308, the third device WT C 306 may implement transmitter yielding and/or the fourth device WT D 308 may implement receiver yielding. When yielding, a device may determine whether its transmission power will unacceptably interfere with transmissions of other nearby devices. Such yielding may also take into account the relative priority of the different transmissions or peer-to-peer connections associated with such transmissions. For instance, a device may decide to yield only if it has a lower connection or transmission priority than another connection or transmission.

In a peer-to-peer network, a connection scheduling stage and a rate scheduling stage may be employed to transmit traffic. In the connection scheduling stage, transmitter-receiver pairs in the network attempt to decide which peer pairs will transmit in a particular time slot. This can be done by letting the transmitter devices send out transmit requests with a fixed power and the receiver devices echo back the requests with a power inversely proportional to the channel gain between them. A transmitter device decides to yield its traffic transmissions on a particular time slot if it sees an echo or response signal from one of the other receiver devices (not its peer) with a higher priority and strong enough signal strength. A priority can be quality of service (QoS)-based or purely random tokens generated randomly at each time slot. More precisely, a lower priority transmitter device yields to a higher priority transmitter device if $$\frac{h_{11}}{h_{21}} < SINR_{Tx};$$

where $h_{11}$ represents the channel between the transmitter-receiver pair and $h_{21}$ represents interference from the interfering transmitter device. In other words, the lower priority transmitter device WT C 306 makes sure its interference 314' to the higher-priority receiver device WT B 304 relative to the higher-priority transmission signal strength is bounded. This part is usually referred as the transmitter-yielding part. In one example of transmitter yielding, a transmitting device may determine whether its own transmissions will cause unacceptable interference to another device utilizing a shared channel, and if so, it may not send data transmissions on that shared channel.

On the other hand, each receiver will also measure its own signal strength and the interference from the higher-priority transmitters and decide to yield if $$\frac{h_{11}}{\sum h_{i1}} < SINR_{Rx}.$$

In one example of receiver yielding, a receiver device WT D 308 may not send an echo or reply transmission (e.g., in response to a transmission request) if its signal-to-noise ratio is too low, thereby preventing a corresponding interfering transmitting device WT C 306 from sending traffic to the receiver device WT D 308 on the selected channel. In another example, the receiver device may indicate that a lower transmit power should be used by its corresponding transmitter device to avoid interference.

Figure 4:
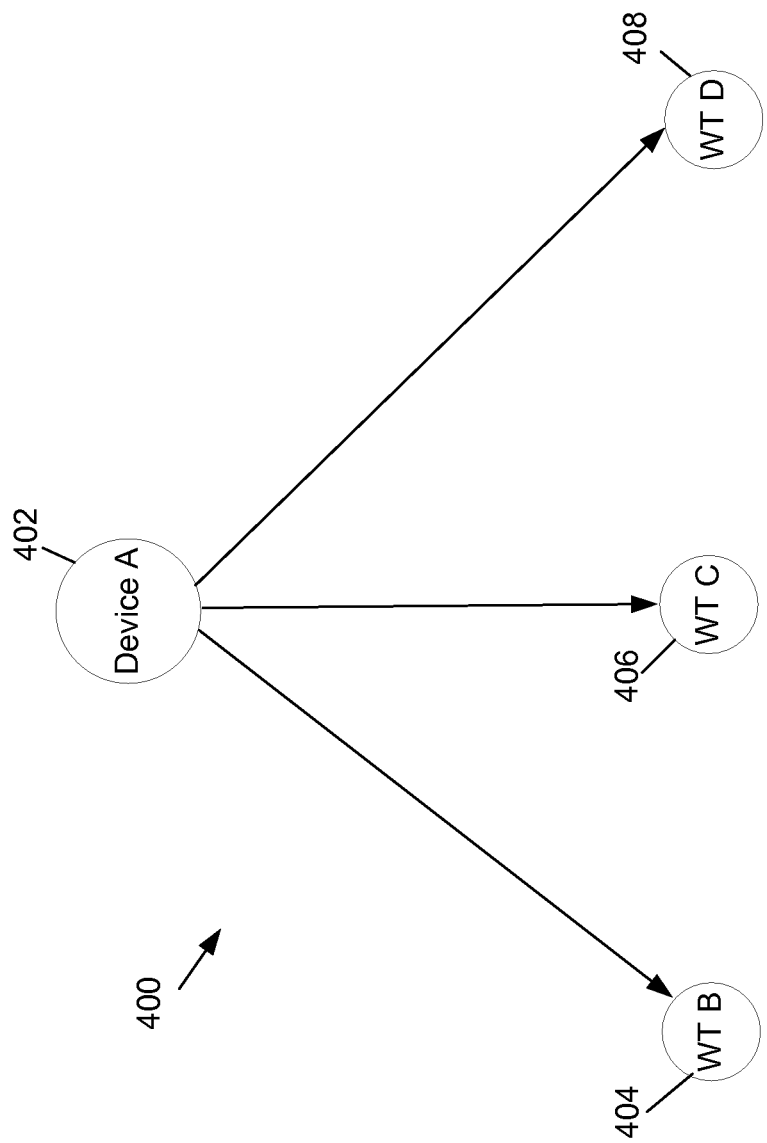
FIG. 4 is a block diagram illustrating a peer-to-peer environment in which a device can simultaneously maintain a plurality of peer-to-peer connections with other wireless terminals.

FIG. 4 is a block diagram illustrating a peer-to-peer environment 400 in which a device can simultaneously maintain a plurality of peer-to-peer connections with other wireless terminals. This is an example of one-to-many and many-to-one peer-to-peer connections. Device A 402 may establish a plurality of individual concurrent peer-to-peer connections with terminals WT B 404, WT C 406, and WT D 408. This may allow Device A 402 to transmit to or receive from any or all of the plurality of terminals WT B 404, WT C 406, and WT D 408 in the same data bursts or time slot (e.g., traffic slot). However, such one-to-many or many-to-one peer-to-peer connections may cause problems with the interference management described in FIG. 3. That is, if terminals WT B 404, WT C 406, and WT D 408 are all trying to transmit to Device A 402 during the same time slot, they may notice their interference and perform transmitter yielding. However, such transmitter yielding would be counter productive to having one-to-many or many-to-one concurrent transmissions.

In particular, a way is needed that allows a wireless terminal communicating with a peer device (e.g., Device A 402) to recognize a one-to-many scenario and disable interference management for the other wireless terminals that concurrently communicate with the same peer device (e.g., Device A 402).

Control Channel Architecture

Figure 5:
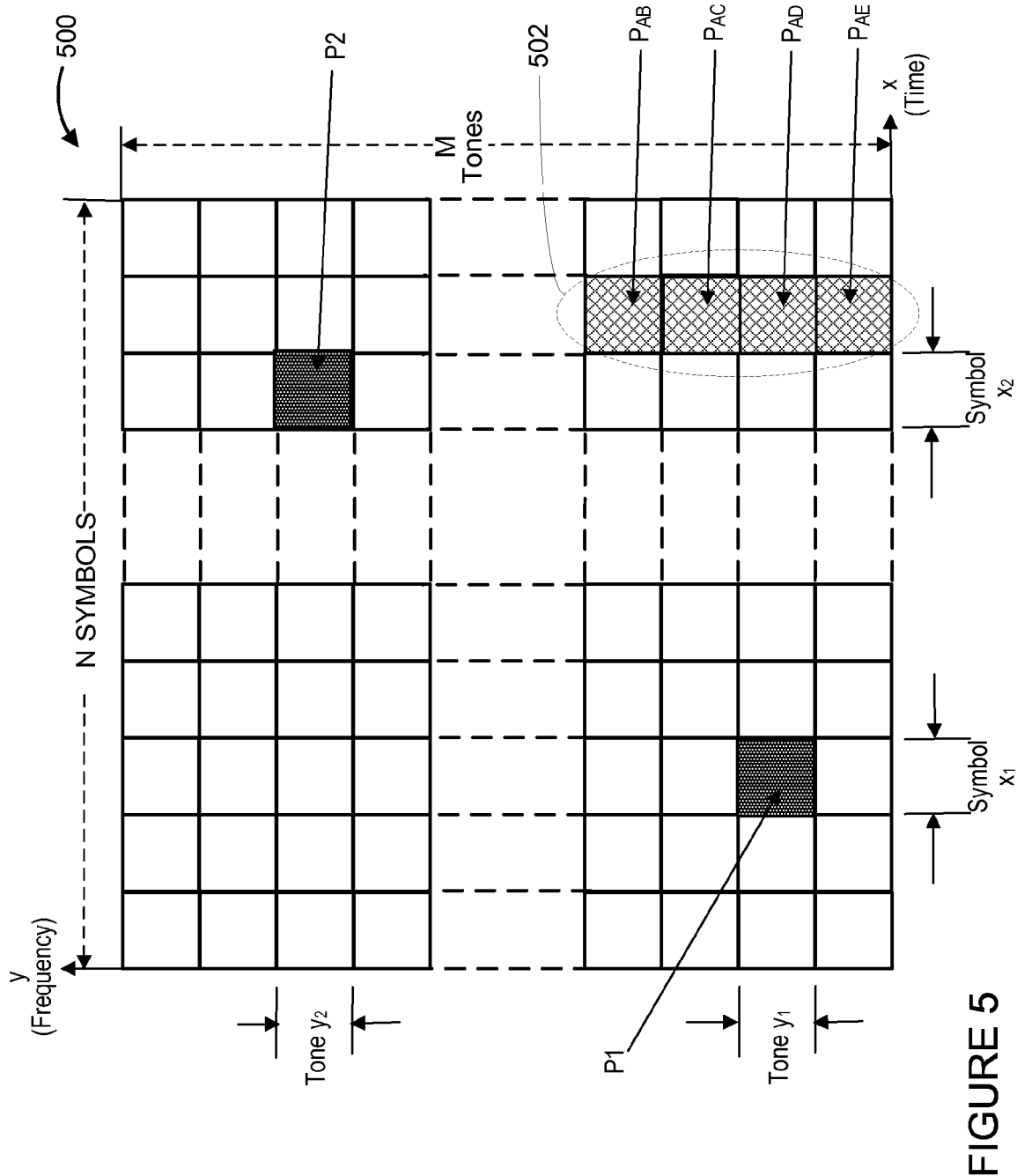
FIG. 5 illustrates an example time-frequency structure associated with a signal transmission.

FIG. 5 illustrates an example time-frequency structure 500 associated with a signal transmission. The exemplary signal may be an OFDM signal. The time-frequency structure 500 is the resource available for transmitting and/or receiving signals over a peer-to-peer network, e.g., during a control slot (e.g., control slot 214 in FIG. 2) and/or traffic channel slot (traffic slot 210 in FIG. 2 within traffic management channel 201). The x-axis represents time and may include N symbols (e.g., where N may be any integer), and the y-axis represents frequency and may include M tones (e.g., where M may be any integer).

A transmitter and/or receiver terminal may use the time-frequency structure 500 in the traffic management channel. For instance, the time-frequency structure 500 may be considered a connection identifier (CID) resource space from which a terminal may select a CID resource unit corresponding to a CID. For example, in a traffic slot, a transmitter terminal may select a CID resource unit to signal a transmission request to the corresponding receiver terminal of the connection associated with the CID. Similarly, the receiver terminal may select a CID resource unit to signal a request response to the transmitter terminal. The CID resource units available for the transmitter terminal and for the receiver terminal may be partitioned a priori in a fixed manner so that the transmitter terminal selects a CID resource unit in a fixed subset of the total time-frequency structure of the traffic management channel, while the receiver terminal selects a CID resource unit in a different fixed subset of the total time-frequency structure of the traffic management channel. Such CID resource space may be transmitted, for example, in a control slot 214 (in FIG. 2) and/or traffic slot 210 (in FIG. 2 within traffic management channel 201). A CID resource unit, which may also be referred to as a "tile", may be defined by a plurality of tones with a symbol (e.g., OFDM symbol).

A CID resource unit may be defined by a time-frequency combination or symbol-tone combination. According to an example, in a control slot or a traffic management portion of a traffic slot, a terminal may select a particular symbol (e.g., transmission time) for transmission based upon an identifier of the wireless terminal or a user who is utilizing the wireless terminal and/or a time variable (e.g., time counter) that may be commonly understood within a peer-to-peer network to identify the current slot interval. Further, a particular tone corresponding to the selected symbol may be determined (e.g., based upon the identifier and/or time variable). Pursuant to a further example, a hash function of the identifier and the time variable may yield the selected symbol position and/or tone position. For example, for a given connection, when the time variable takes a first value, the hash function may yield symbol $x_1$ and tone $y_1$ such that the wireless terminal transmits a single-tone signal $P_1$ as shown in FIG. 5 as the CID resource unit. When the time variable takes a second value, the hash function may yield symbol $x_2$ and tone $y_2$ such that the wireless terminal transmits a single-tone signal $P_2$ as shown in FIG. 5 as the CID resource unit.

For peer-to-peer connections between a device a multiple terminals (e.g., one-to-many), a subset of resource units or tiles 502 (e.g. that may be contiguously located or pseudo-randomly selected from among the units of the structure 500) may be used to identify the different peer-to-peer connections to the single device. For example, a first peer-to-peer connection (between devices A and B) may be identified by resource unit $P_{AB}$, a second peer-to-peer connection (between devices A and C) may be identified by resource unit $P_{AC}$, a third peer-to-peer connection (between devices A and D) may be identified by resource unit $P_{AD}$, a second, and a fourth peer-to-peer connection (between devices A and E) may be identified by resource unit $P_{AE}$.

In one example, the allocation of resource units 502 may be done in a reserved area of the time-frequency structure 500 so that the terminals that are part of the one-to-many connections know that they can disable interference management. The selection of a particular subset of contiguous of resource units 502 may be signaled to the terminals, for example, during a paging period. For example, when a connection is first established, a Device A 402 (FIG. 4) may signal to the terminals WT B 404, WT C 406, and WT D 408 which resource units to use. This way, Device A 402 may maintain the resource units within a single symbol. Device A may be an access router, which provides network access to other devices, e.g., WT B, WT C, WT D. Device A may reserve the subset of resource units 502 beforehand. Suppose Device A 402 is providing access service only to WT B 404. The first resource unit $P_{AB}$ in the subset 502 may be used between A and B, while the other resource units in subset 502 are idle. Then suppose terminal WT C 406 requests access service from Device A 402. Then the second resource unit $P_{AC}$ may be used between A and C. Since Device A has reserved the subset 502 of the resource units, WT B 404 knows that the resource units in the subset 502 other than the one $P_{AB}$ used between the (A, B) connection are used or to be used by "sibling" connections (e.g., the (A, C), (A, D) connections), and can treat them differently from the interference management perspective. Similarly, WT C 406 knows that the resource units in the subset 502 other than the one $P_{AC}$ used by the (A, C) connection are used or to be used by "sibling" connections, and can treat them differently from the interference management perspective. In the above example, the knowledge of sibling connections is simply available at WT B 404, WT C 406, and/or WT D 408 because Device A 402 has reserved the subset of resource units 502 for the sibling connections beforehand. Alternatively, Device A 402 may not reserve anything. For example, Device A 402 may start with a connection with WT B 404. When WT C 406 joins in, Device A 402 may inform WT B 404 the connection identifier or resource unit $P_{AC}$ used by the (A, C) connection so that WT B 404 knows the new sibling connection. Furthermore, Device A 402 informs WT C 404 the connection identifier or resource unit $P_{AB}$ used by the (A, B) connection so that WT C 406 knows the existing sibling connection. In this case, when a connection drops, Device A 402 needs to inform the other terminals so that they know one of the sibling connections no longer exists. In another example, Device A 402 may use a hybrid scheme in which Device A 402 may start by reserving a small subset of resource units and as more sibling connections have been established, Device A 402 reserves additional resource units and informs the existing sibling connections.

In one example, the position of the location of a selected tone-symbol (e.g. resource unit) may serve to indicate the priority of a transmission for a particular time slot (e.g., traffic slot). After seeing a transmission request, a corresponding receiver device may send back an echo or request response in another pseudo-random location in the Rx symbols of the time-frequency structure. The transmitter devices and/or receiver devices may decide whether or not to transmit in a current time slot based on this position-based priority information and a power measurement from the request and echo locations. For example, a location on a left column and/or bottom row of the structure 500 may be considered lower priority than locations on a further right column and further top rows.

Collision Avoidance Using Transmission CIDs

When a transmitter terminal wants to initiate communications with a certain neighboring receiver terminal, it first selects one or more transmission CIDs which are not used in its neighborhood. In a synchronous wireless network, this can be achieved by introducing a CID broadcast period in a slow time scale, e.g., once every second. In general, it makes sense to make the CID broadcast period the same as the paging period, where terminals ping each other to start the conversation.

Figure 6:
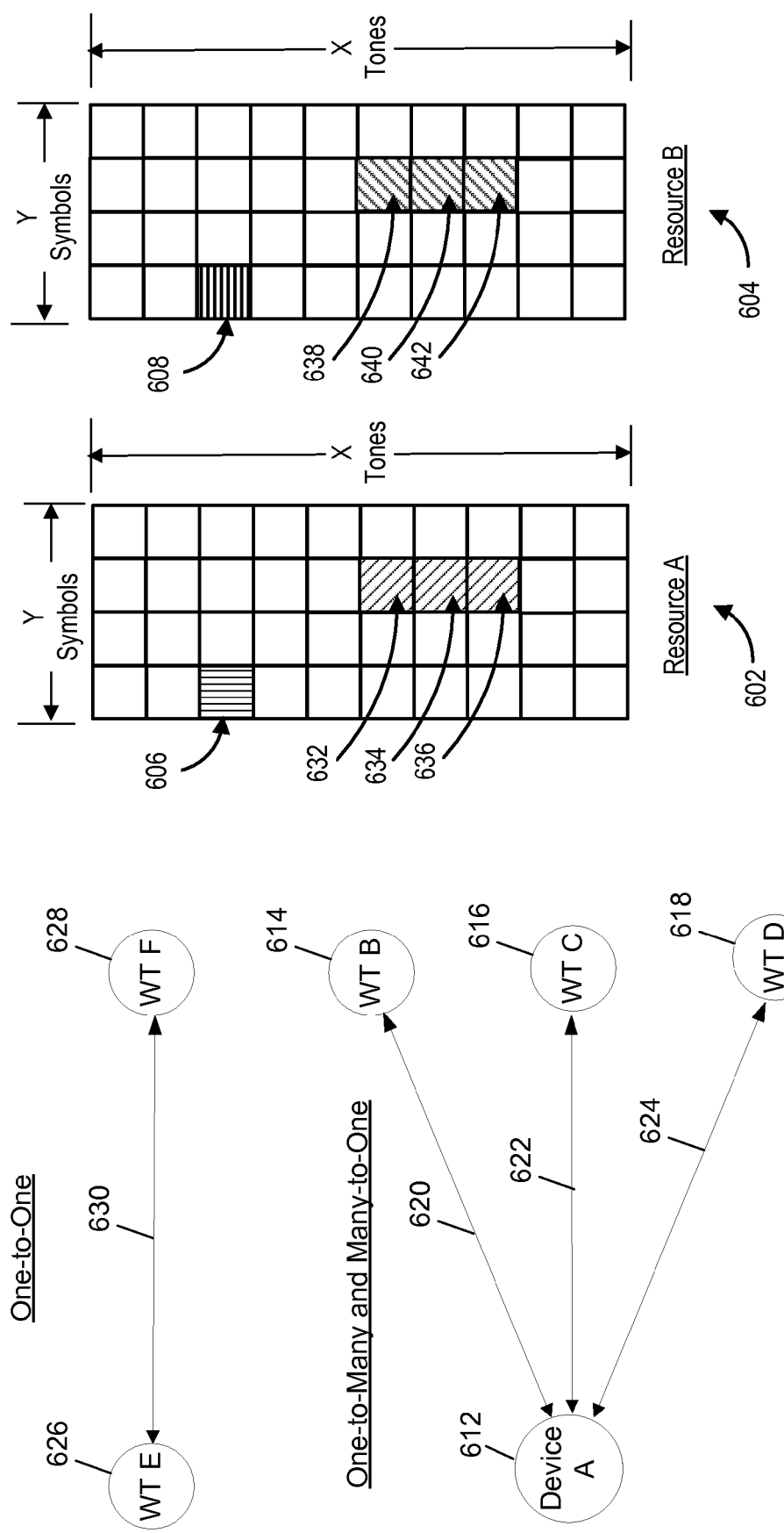
FIG. 6 illustrates one example of a two-part CID broadcast structure where each part covers the whole transmission CID space.

FIG. 6 illustrates one example of a two-part CID broadcast structure where each part covers the whole transmission CID space. For example, assuming the transmission CID space spans from 1 to N, each CID broadcast resource A 602 and B 604 in FIG. 6 may have N degrees of freedom. For example, each resource A and B may include X tones in Y OFDM symbols, where N=X*Y. Suppose that terminals WT E 626 and WT F 628 are associated with a connection 630 that has already had a CID. Suppose that the connection 630 was established when the terminal WT E 626 pages the terminal WT F 628. That is, between the terminals WT E 626 and WT F 628, it is understood that the terminal WT E 626 was the initiator and the terminal WT F 628 the target. Then the terminal 626 transmits a first signal 606 in the tone of the symbol corresponding to the CID of the connection 630 in resource A 602, while the terminal WT F 628 transmits a second signal 608 in the tone of the symbol corresponding to the CID of the connection 630 in resource B 604. In an alternative implementation, the CID broadcast period may include a single resource (i.e., just Resource A 602), in which case, the terminals WT E 626 and WT F 628 may take turns to broadcast in the CID broadcast periods, e.g., according to a fixed pattern (e.g., alternate even/odd periods or pseudo random). That is, in a first CID broadcast period, the terminal WT E 626 may transmit on the single resource (e.g., resource A 602) and the terminal WT F 628 listens, while on a second broadcast period, the terminal WT F 628 may transmit on the same single resource (e.g., resource A 602) while the terminal WT E 626 listens.

One reason that both terminals WT E 626 and WT F 628 send signals in the CID broadcast period is to allow other terminals in the vicinity to be aware that the CID 606 and/or 608 has been occupied. This allows for interference mitigation (e.g., transmitter and/or receiver yielding). Another reason is for one of the two terminals to monitor the presence of the other terminal. In other words, if one terminal drops out, e.g., due to battery failure, or because the distance between the two terminals increases beyond certain range, the CID broadcast period allows the two terminals WT E 626 and WT F 628 to realize that the connection 630 needs to be tore down and the CID resource unit (e.g., 606 and 608 in resources A and B) can to be relinquished. For example, if terminal WT E 626 does not detect the CID broadcast signal 608 that needs to be sent by the terminal WT F 628 in the second resource B 604, for some period of time, the terminal WT E 626 may conclude that the connection 630 is down. Subsequently, the terminal WT E 626 relinquishes the CID 606 and no longer sends the CID broadcast signal 606 in the CID broadcast period. This allows the CID (and CID resource units at 606 and 608) to become available again and be selected by other terminals in the vicinity.

A one-to-many connection scheme may also be accommodated within resources A 602 and B 604. In one example, a Device A 612 may have multiple concurrent peer-to-peer connections 620, 622, and 624 with terminals WT B 614, WT C 616, and WT D 618. In such a scheme, contiguous CID resource units 632, 634, 636, 638, 640, and 642 may be used to identify the individual peer-to-peer connections. For example, a first connection 620 may be identified by resource units 632 and 638, a second connection 622 may be identified by resource units 634 and 640, and a third connection 624 may be identified by resource units 636 and 642.

Figure 7:
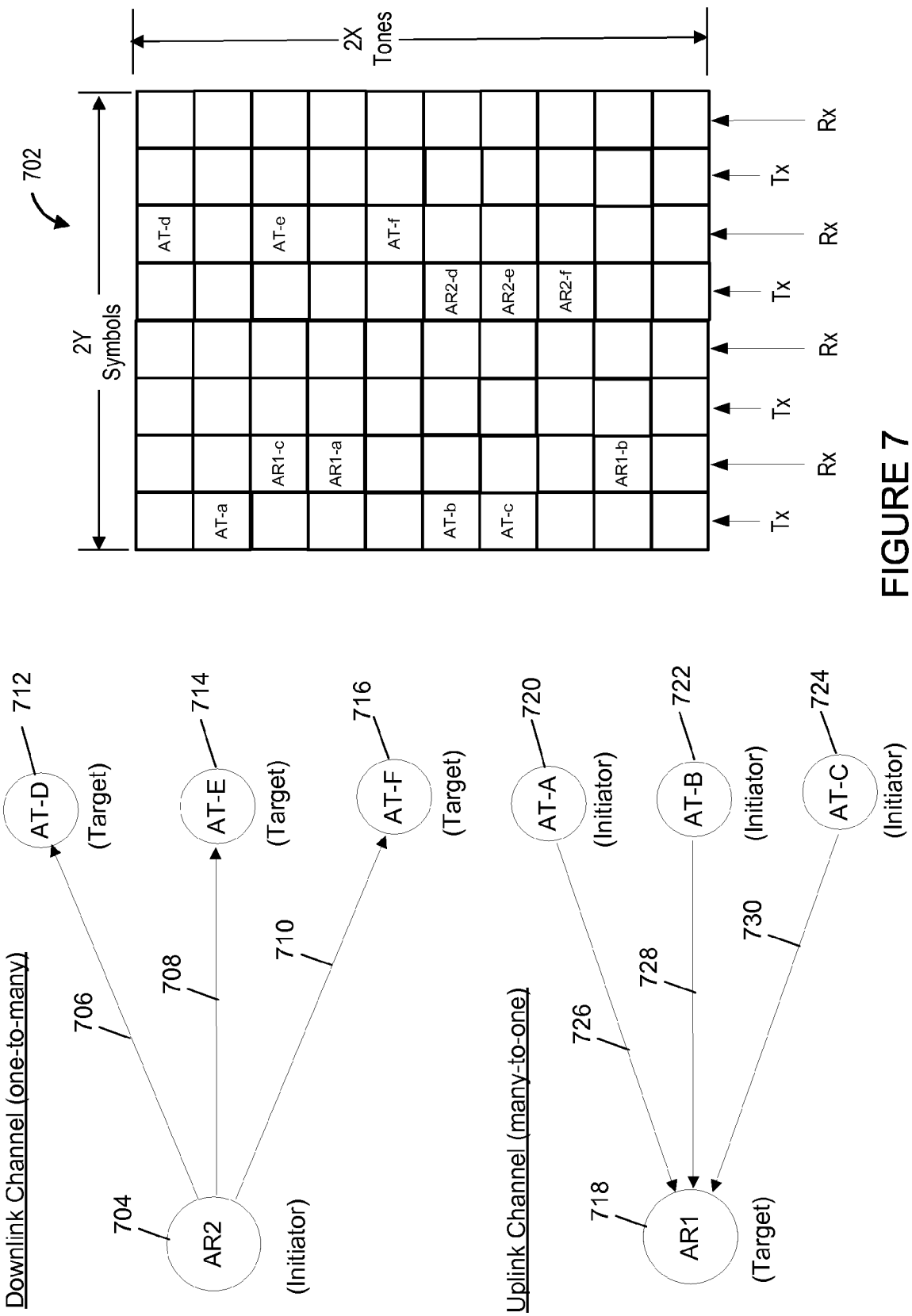
FIG. 7 illustrates an example of how a downlink channel and uplink link channel may be established using a control channel to support one-to-many and many-to-one peer-to-peer communications.

Facilitating One-to-Many and Many-to-One Transmissions in a Peer-to-Peer Network FIG. 7 illustrates an example of how a downlink channel and uplink link channel may be established using a control channel to support one-to-many and many-to-one peer-to-peer communications. For purposes of this example, the transmit (e.g., transmission request) and echo (e.g., request response) time-frequency structures may be combined into a single tone-frequency structure 702 where interleaved columns of symbols (Tx—representing transmit or transmission request and Rx—representing echo or request response) are used. However, it should be understood that alternative structures can also be used, for example, where a first time-frequency structure is used for transmit requests while a second time-frequency structure is used for echos (e.g., request responses). In this example, a device capable of communicating with multiple terminals over distinct peer-to-peer connections is identified as an AR while a terminal is identified as an AT.

A control channel includes both a connection scheduling stage and a rate scheduling stage as described in FIG. 2. The connection scheduling stage mainly deals with interference management between different transmitter/receiver pairs and between peer-to-peer transmissions (one-to-one) and AR/AT transmissions (one-to-many and many-to-one). A "transmitter" or "initiator" device may be the device that intends to send a traffic signal to the other device ("receiver" or "target") of the connection. Each transmitter device may choose a tone-symbol (e.g., in a time-frequency structure) to send a traffic request in the Tx symbols while an echo or response may be sent by a receiver device in the Rx symbols if the receiver device intends to receive the traffic signal from the transmitter device. For simplicity, peer-to-peer communications from an AR to an AT are referred to as "downlink channel" while peer-to-peer communications from an AT to an AR are referred to as "uplink channel".

For downlink channel communications, an AR2 704 may pick multiple tone-symbols from the Tx symbols to send transmission requests to the ATs associated with the AR2, according to certain algorithm. For example, the tones used to send the transmission requests may be determined by the connection identifiers of the connections between AR2 and ATs 712, 714, and 716. It may be desirable that the AR2 704 choose the same symbol to send out its requests to the multiple ATs 712, 714, and 716 to mitigate desensing problems. The corresponding ATs 712, 714, and 716 associated with AR2 704 listen to the Tx symbol in the tone locations determined by their connection identifiers. In this way, communications between AR2 704 and the multiple ATs 712, 714, and 716 behave in a similar way to peer-to-peer communications and compete for the system resource according to the same protocol. After AR2 704 sees the echoes (e.g., responses) from the ATs 712, 714, and 716, it estimates the channel for all the ATs in the rate scheduling stage. AR2 704 may then make further scheduling decision on resource allocation and transmits this scheduling information as a broadcast message within the data burst.

In an example of a downlink channel, where a transmitter device AR2 704 intends to transmit traffic signals to a plurality of peer-to-peer connections 706, 708, and 710 with a plurality of terminals AT-D 712, AT-E 714, and AT-F 716, each transmission request may be identified by a Tx tone-symbol in the time-frequency structure 702. For instance, a first transmission request from AR2 704 to terminal AT-D 712 may be identified by AR2-*d*, a second transmission request from AR2 704 to terminal AT-E 714 may be identified by AR2-*e*, and a third transmission request from AR2 704 to terminal AT-F 716 may be identified by AR2-*f*. The corresponding responses may be identified by a Rx tone-symbol in the time-frequency structure 702. For instance, a first request response from terminal AT-D 712 to AR2 704 may be identified by AT-d, a second request response from terminal AT-E 714 to AR2 704 may be identified by AT-e, and a third request response from terminal AT-F 716 to AR2 704 may be identified by AT-f. In accordance with one feature, AT-D 712 knows that connections 708 and 710 are sibling to its own connection 706 with AR2 704. Therefore, when AT-D 712 receives the transmission requests AR2-*e* and AR2-*f*, it knows that those transmission requests come from the same device AR2 from which AT-D 712 is receiving. Note that in order to decide whether it intends to receive the traffic signal from AR2 704, AT-D 712 needs to estimate the signal-to-interference ratio, where the signal power may be determined by the signal strength of received request signal AR2-*d* and the interference power may be determined by the signal strengths of other received request signals. Transmission request signals corresponding to other connections in the vicinity (not shown in the figure) may also be sent. Knowing that AR2-*e* and AR2-*f* request signals correspond to the sibling connections, AT-D 712 can exclude those request signals when it predicts the interference power and SNR. In other words, when AT-D 712 predicts the interference power, it may take into account the received transmission request signals corresponding to connections other than the sibling connections. If the predicted SNR is low, AT-D 712 may decide not to respond to the request from AR2 704. Otherwise, AT-D 712 may send a request response AT-d in structure 702. Terminals AT-E 714 and AT-F 716 operate in a similar way as AT-D 712. Now, suppose that request response signals AT-d, AT-e, and AT-f are all sent in the Rx symbol (sixth column) shown in 702. Request response signals corresponding to other connections in the vicinity (not shown in the figure) may also be sent. Note that in order to decide whether it intends to proceed to send the traffic signal to AT-D 712, AR2 704 needs to estimate the interference cost to receivers corresponding to other connections. The estimated interference cost depends on the signal strength of the received request response signal. Knowing that AT-e and AT-f response signals correspond to the sibling connections, AR2 704 can exclude those response signals when it predicts the interference cost. In other words, when AR2 704 predicts the interference cost and determines whether to proceed to send the traffic signal to AT-D, it may take into account the received request response signals corresponding to connections other than the sibling connections.

For an uplink channel, a similar scheme can be used where different ATs 720, 722, and 724 choose tone and symbols locations based on the corresponding connection identifiers in Tx symbols of the time-frequency structure 702 to send out traffic requests to an AR1 718 while the AR1 718 sends echoes or responses to each AT 720, 722, and 724 in the Rx symbols. One technicality here is that it is possible that the ARs can schedule multiple ATs for either uplink or downlink in the same slot via FDM/TDM or super-position coding. In this case, uplink echoes also contain certain scheduling decision. For example, if two ATs can be scheduled together in a slot, the AR only echoes up to two AT traffic requests in each slot and the AT that gets a higher-position echo will be assigned a certain portion of the traffic slot. In this case, the ATs associated with the same AR have to have the ability to differentiate the tones they see since it is undesirable that they yield to the echoes designated for one of their siblings. To avoid this, the tone/symbol location generation mechanism may be designed in such a way that each AT is aware of all the possible echoes from the AR with which it is associated.

In an example of an uplink channel, where transmitter terminals AT-A 720, AT-B 722, and AT-C 724 tend to transmit traffic signals to AR1 718 via peer-to-peer connections 726, 728, and 730 respectively, each transmission request may be identified by a Tx tone-symbol in the time-frequency structure 702. For instance, a fourth transmission request from terminal AT-A 720 to AR1 718 may be identified by AT-a, a fifth transmission request from terminal AT-B 722 to AR1 718 may be identified by AT-b, and a sixth transmission request from terminal AT-C 724 to AR1 718 may be identified by AT-c. The corresponding responses may be identified by a Rx tone-symbol in the time-frequency structure 702. For instance, a fourth request response from AR1 718 to terminal AT-A 720 may be identified by AR1-*a*, a fifth request response from AR1 718 to terminal AT-B 722 may be identified by AR1-*b*, and a sixth request response from AR1 718 to terminal AT-C 724 may be identified by AR1-*c*. In accordance with one feature, AR1 718 knows that connections 726, 728 and 730 are all siblings. Therefore, when AR1 718 receives the transmission requests AT-a, AT-b, AT-c, it knows that those transmission requests are intended for the same device AR1. Note that in order to decide whether it intends to receive the traffic signal from AT-A, AR1 718 needs to estimate the signal-to-interference ratio, where the signal power may be determined by the signal strength of received request signal AT-A and the interference power may be determined by the signal strengths of other received request signals. Transmission request signals corresponding to other connections in the vicinity (not shown in the figure) may also be sent. Knowing that AT-b and AT-c request signals correspond to the sibling connections, AR1 718 can exclude those request signals when it predicts the interference power and SNR. In other words, when AR1 718 predicts the interference power, it may take into account the received transmission request signals corresponding to connections other than the sibling connections. If the predicted SNR is low, AR1 718 may decide not to respond to the request from AT-A 720. Otherwise, AR1 718 may send a request response AR1-*a* in structure 702. AR1 718 operates in a similar way to handle the transmission requests from AT-B 722 and AT-C 724. Now, suppose that request response signals AR1-*a*, AR1-*b*, and AR1-*c* are all sent in the Rx symbol shown in structure 702. Request response signals corresponding to other connections in the vicinity (not shown in the figure) may also be sent. Note that in order to decide whether it intends to proceed to send the traffic signal to AR1 718, AT-A 720 needs to estimate the interference cost to receivers corresponding to other connections. The estimated interference cost depends on the signal strength of the received request response signal. Knowing that AR1-*b* and AR1-*c* response signals correspond to the sibling connections, AT-A 720 can exclude those response signals when it predicts the interference cost. In other words, when AT-A 720 predicts the interference cost and determines whether to proceed to send the traffic signal to AR1 718, it may take into account the received request response signals corresponding to connections other than the sibling connections. Terminals AT-B 722 and AT-C 724 operate in a similar way to handle the request responses from AR1 718.

In some implementations, an AR may be a router having wireless peer-to-peer communication capabilities and, possibly other network interfaces. Such router may bypass infrastructure devices of a wide area network so that peer-to-peer communications may be facilitated with remote terminals via the router.

Operation of Downlink Control Channel—One-to-Many Scheme

Figure 8A:
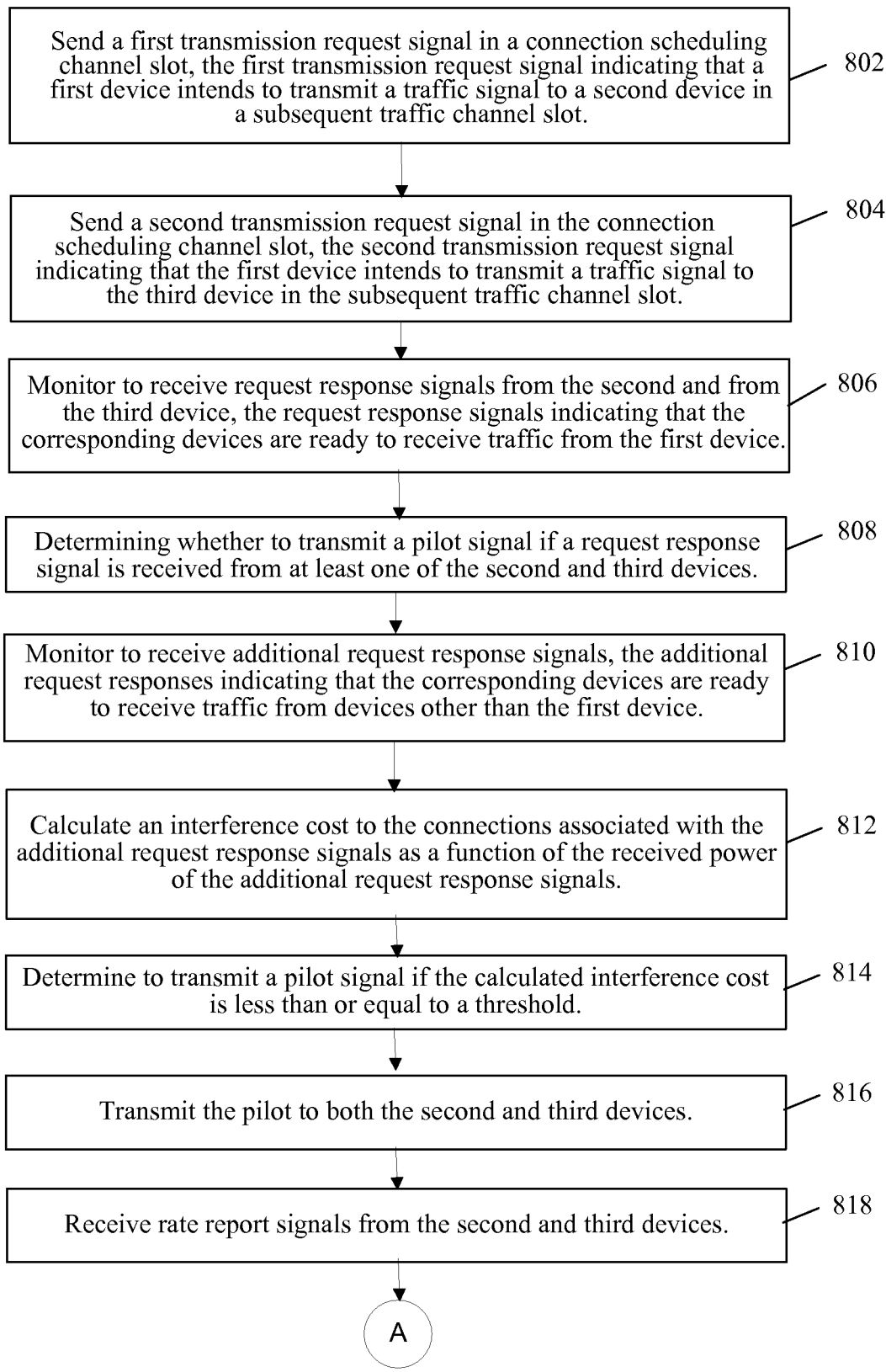
FIG. 8 (comprising FIGS. 8A and 8B) illustrates a method operational in a first device for facilitating communications with a plurality of devices including a second device and a third device within a peer-to-peer network.
Figure 8B:
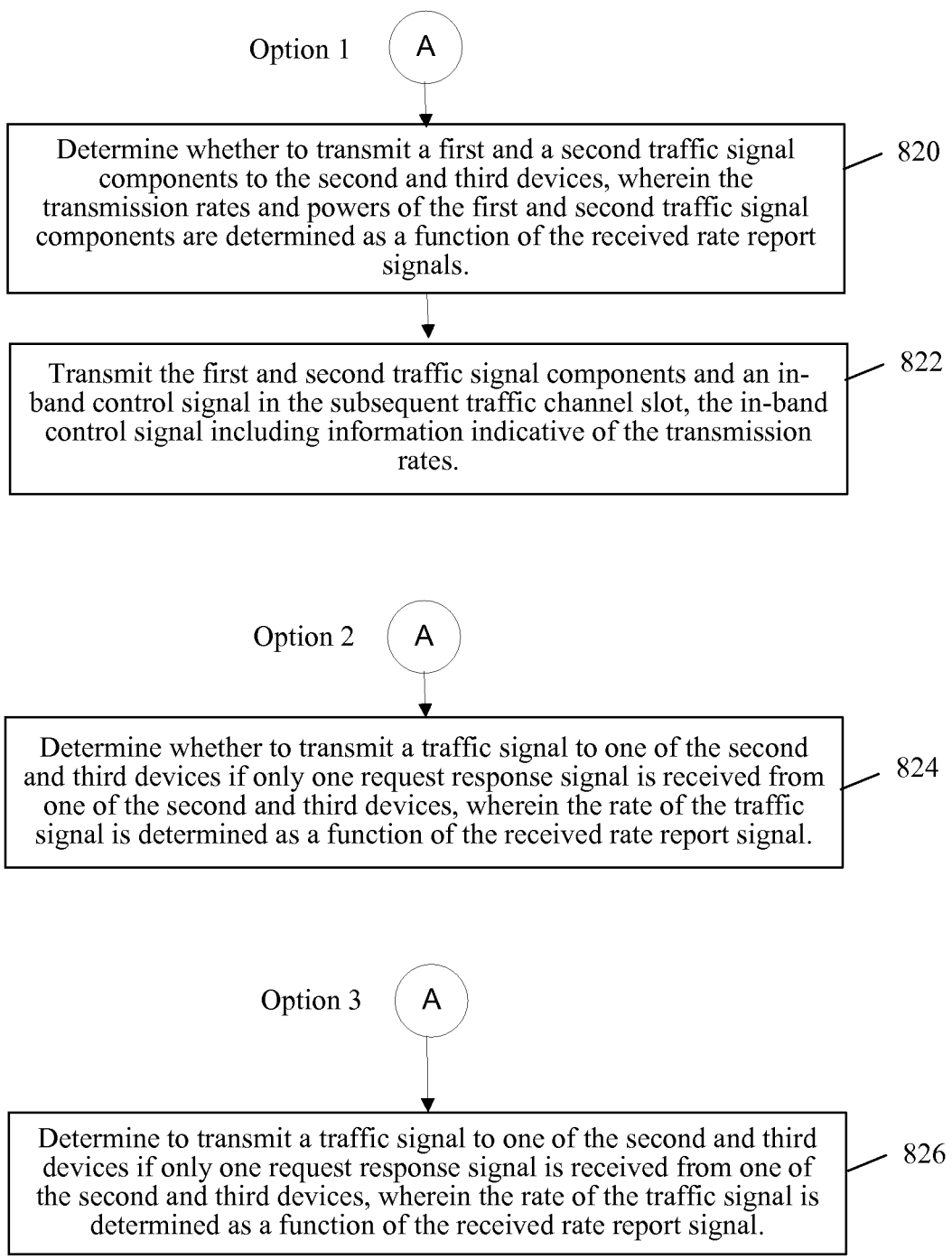

FIG. 8 (comprising FIGS. 8A and 8B) illustrates a method operational in a first device for facilitating communications with a plurality of devices including a second device and a third device within a peer-to-peer network. The first device may have a first connection with the second device and a second connection with the third device. In this example, the first device may be a device capable of maintaining multiple concurrent peer-to-peer connections with other devices in its vicinity. The first device is the initiator or transmitter while the second and third devices are the targets or receivers.

The first device may send a first transmission request signal in a connection scheduling channel slot, the first transmission request signal indicating that the first device intends to transmit a traffic signal to the second device in a subsequent traffic channel slot 802. Similarly, the first device may send a second transmission request signal in the connection scheduling channel slot, the second transmission request signal indicating that the first device intends to transmit a traffic signal to the third device in the subsequent traffic channel slot 804. The connection scheduling channel slot may include a plurality of OFDM symbols, each of the plurality of OFDM symbols including a plurality of tones. For example, such connection channel slot may include a time-frequency structure as illustrated in FIGS. 5, 6, and 7. The first transmission request signal may be transmitted in a tone in one of the plurality of the OFDM symbols and the second transmission request signal may be transmitted in a tone in one of the plurality of OFDM symbols. In one implementation, the OFDM symbol in which the first transmission request signal is transmitted may be the same as the OFDM symbol in which the second transmission request signal is transmitted.

The first device may subsequently monitor (a shared frequency spectrum) to receive request response signals from the second and from the third device, the request response signals indicating that the corresponding devices are ready to receive traffic from the first device 806. The first device may then determine whether to transmit a pilot signal if a request response signal is received from at least one of the second and third devices 808.

The first device also monitors to receive additional request response signals, the additional request responses indicating that the corresponding sender devices are ready to receive traffic from devices other than the first device 810. The first device may then determine whether it should perform transmitter yielding. The first device may calculate an interference cost to the connections associated with the additional request response signals as a function of the received power of the additional request response signals 812. The first device may then determine whether to transmit a pilot signal if the calculated interference cost is less than or equal to a threshold 814. If the interference cost is less than or equal to the threshold, the pilot is transmitted by the first device to both the second and third devices 816. Subsequently, the first device may receive rate report signals from the second and third devices 818. When the first device calculates the interference cost for the traffic to the second device, the first device may exclude the request response signal received from the third device, because the two connections are sibling. Similarly, when the first device calculates the interference cost for the traffic to the third device, the first device may exclude the request response signal received from the second device, because the two connections are sibling.

According to one option, the first device may determine whether to transmit a first and a second traffic signal components to the second and third devices, wherein the transmission rates and powers of the first and second traffic signal components are determined as a function of the received rate report signals 820. The first device may then transmit the first and second traffic signal components and an in-band control signal in the subsequent traffic channel slot, where the in-band control signal includes information indicative of the transmission rates 822. The subsequent traffic channel slot may include a plurality of OFDM symbols, where each of the plurality of OFDM symbols includes a plurality of tones. The first and second traffic signal components may be transmitted in two disjoint subsets of a plurality of tone-symbols within the traffic channel slot, where each of the plurality of tone-symbols being a tone in one OFDM symbol. In one example, the two subsets of tone-symbols may overlap substantially in time. For example, the first subset includes a subset of tones in all the OFDM symbols, while the second subset includes the remaining subset of tones in all the OFDM symbols. In another example, the two subsets are non-overlapping in time. For example, the first subset includes all the tones in a first subset of OFDM symbols, while the second subset includes all the tones in the remaining subset of OFDM symbols.

The in-band control signal may include information indicating that the first and the second traffic signal components are transmitted using the two subsets and assignment information of which one of the two subsets is used for which one of the first and the second connections. In one implementation, the first traffic signal component may be superposed on the second traffic signal component to form the traffic signal transmitted in the traffic channel slot.

According to a second option, the first device may determine whether to transmit a traffic signal to one of the second and third devices if only one request response signal is received from one of the second and third devices, wherein the rate of the traffic signal is determined as a function of the received rate report signal 824.

According to a third option, the first device may deciding to transmit a traffic signal to only one of the second and third devices, as a function of the received rate report signals, subsequent to receiving request response signals from both the second and third devices 826.

Figure 9A:
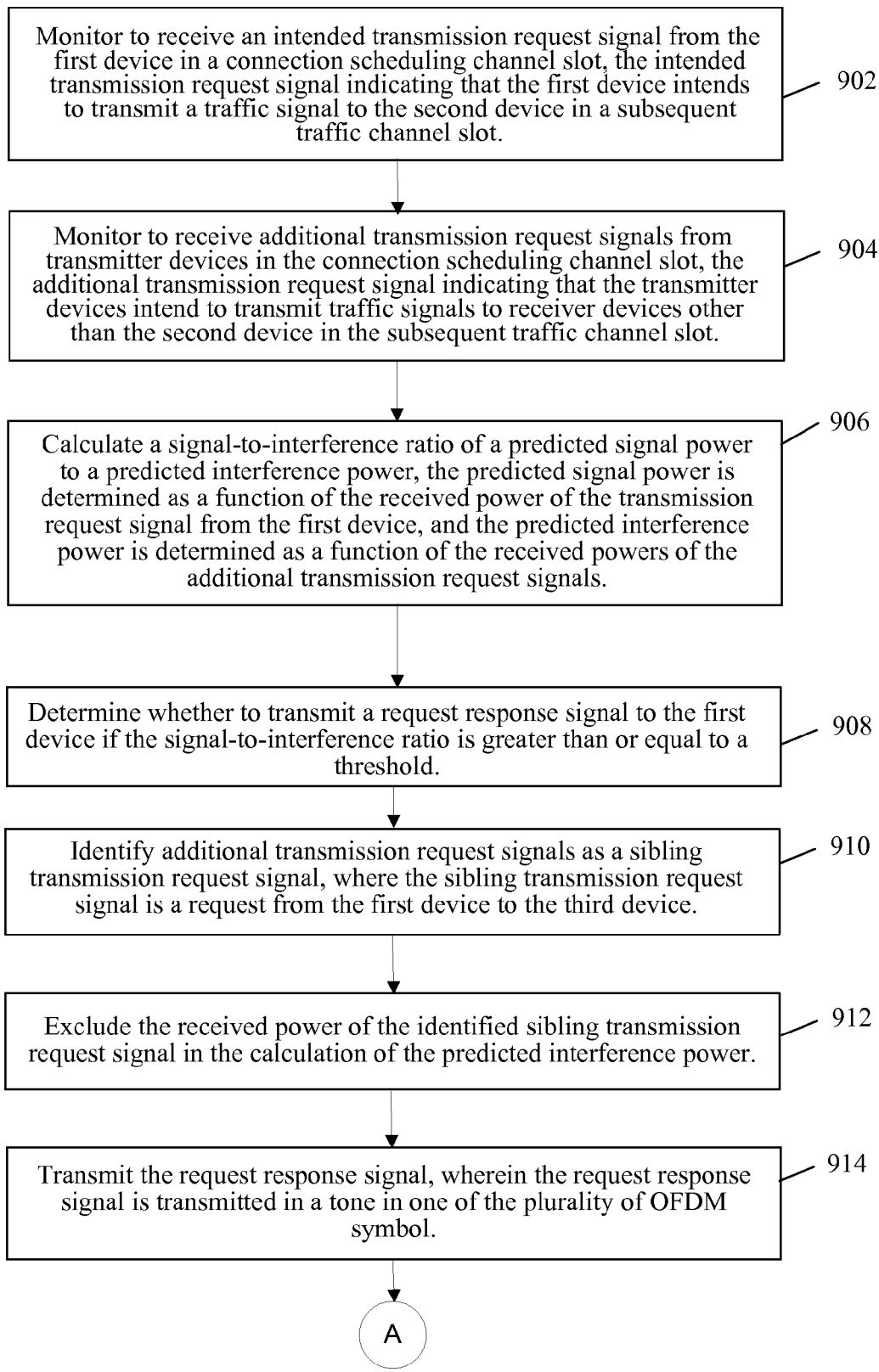
FIG. 9 (comprising FIGS. 9A and 9B) illustrates a method operational in a second device for facilitating communications with a first device within a peer-to-peer network.
Figure 9B:
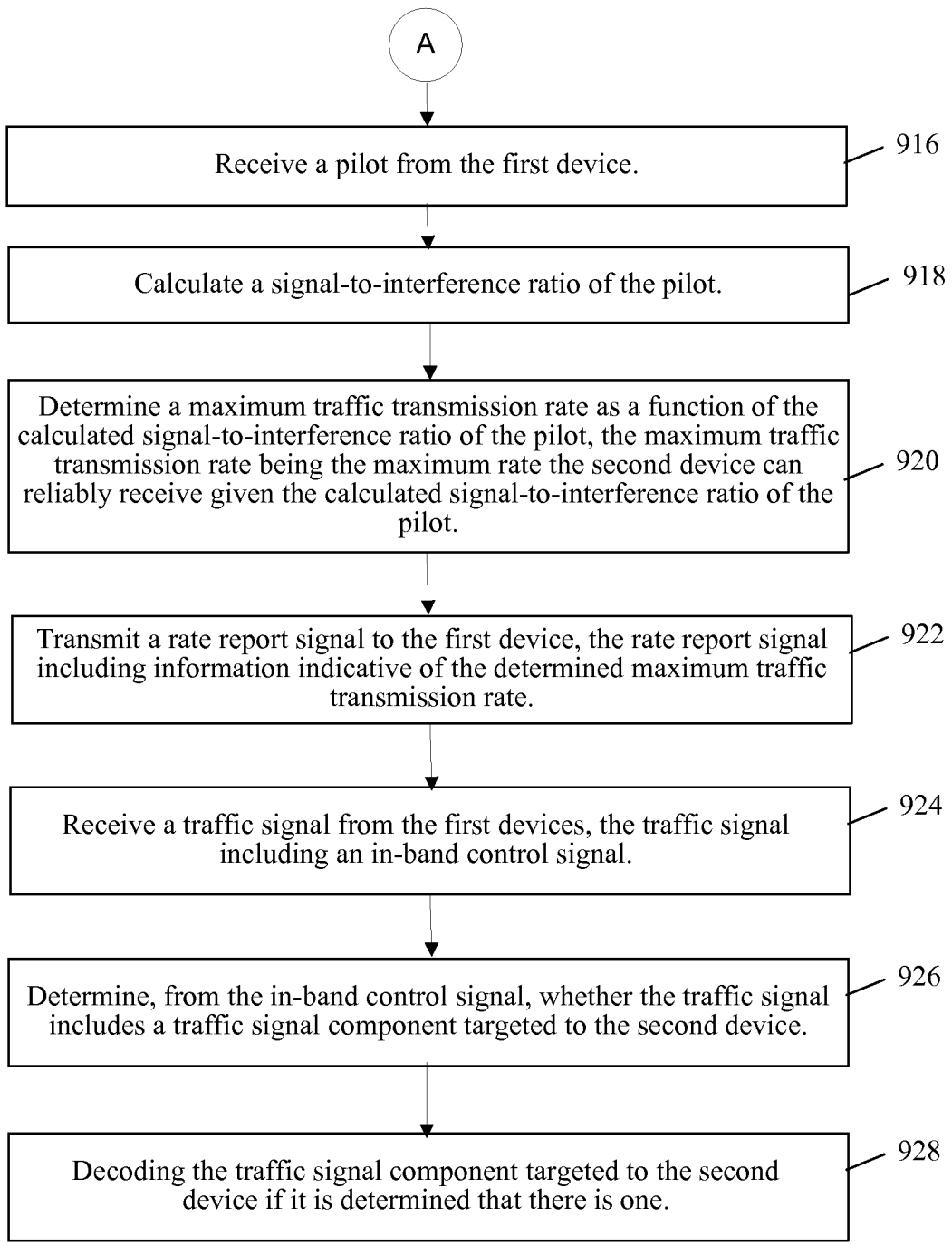

FIG. 9 (comprising FIGS. 9A and 9B) illustrates a method operational in a second device for facilitating communications with a first device within a peer-to-peer network. The first device may have a first connection with the second device and a second connection with the third device. In this example, the first device may be a device capable of maintaining multiple concurrent peer-to-peer connections with other devices in its vicinity. The first device is the initiator or transmitter while the second and third devices are the targets or receivers.

The second device monitors (a shared frequency spectrum) to receive an intended transmission request signal from the first device in a connection scheduling channel slot, the intended transmission request signal indicating that the first device intends to transmit a traffic signal to the second device in a subsequent traffic channel slot 902. Similarly, the second device also monitors to receive additional transmission request signals from transmitter devices in the connection scheduling channel slot, the additional transmission request signal indicating that the transmitter devices intend to transmit traffic signals to receiver devices other than the second device in the subsequent traffic channel slot 904. A signal-to-interference ratio is calculated by the second device, where the signal-to-interference ratio is the ratio of a predicted signal power to a predicted interference power, the predicted signal power is determined as a function of the received power of the transmission request signal from the first device, and the predicted interference power is determined as a function of the received powers of the additional transmission request signals 906. The second device then determines whether to transmit a request response signal to the first device if the signal-to-interference ratio is greater than or equal to a threshold 908. One or more of the additional transmission request signals may be identified by the second device as a sibling transmission request signal, where the sibling transmission request signal is a request from the first device to the third device 910. The third device may exclude the received power of the identified sibling transmission request signal in the calculation of the predicted interference power 912.

The connection scheduling channel slot may include a plurality of OFDM symbols, each of the plurality of OFDM symbols including a plurality of tones, and wherein the intended transmission request signal is transmitted in a tone in one of the plurality of OFDM symbol and the sibling transmission request signal is transmitted in a tone in one of the plurality of OFDM symbol. The OFDM symbol in which the intended transmission request signal is transmitted may be the same as the OFDM symbol in which the sibling transmission request signal is transmitted. The tone in which the sibling transmission request signal is transmitted may be known to the second device. The second device may transmit the request response signal in a tone in one of the plurality of OFDM symbol 914.

The second device may also receive a pilot from the first device 916. A signal-to-interference ratio of the pilot may be calculated by the second device 918. A maximum traffic transmission rate may also be determined as a function of the calculated signal-to-interference ratio of the pilot, the maximum traffic transmission rate being the maximum rate the second device can reliably receive given the calculated signal-to-interference ratio of the pilot 920. A rate report signal is transmitted by the second device to the first device, the rate report signal including information indicative of the determined maximum traffic transmission rate 922. A traffic signal may be received by the second device from the first devices, where the traffic signal includes an in-band control signal 924. The second device can then determine, from the in-band control signal, whether the traffic signal includes a traffic signal component targeted to the second device 926. If so, the second device decodes the traffic signal component targeted to the second device 928.

The in-band control signal may include information indicating that the traffic channel slot is partitioned into at least two disjoint subsets of a plurality of tone-symbols within the traffic channel slot, where each of the plurality of tone-symbols being a tone in one OFDM symbol, and the assignment information of which one of the at least two disjoint subsets is assigned to transmit the traffic signal component targeted to the second device. Consequently, the second device can retrieve modulation symbols from the assigned subset of tone-symbols. It can then decode the traffic signal component targeted to the second device from the retrieved modulation symbols.

Operation of Uplink Control Channel—Many-to-One Scheme

Figure 10A:
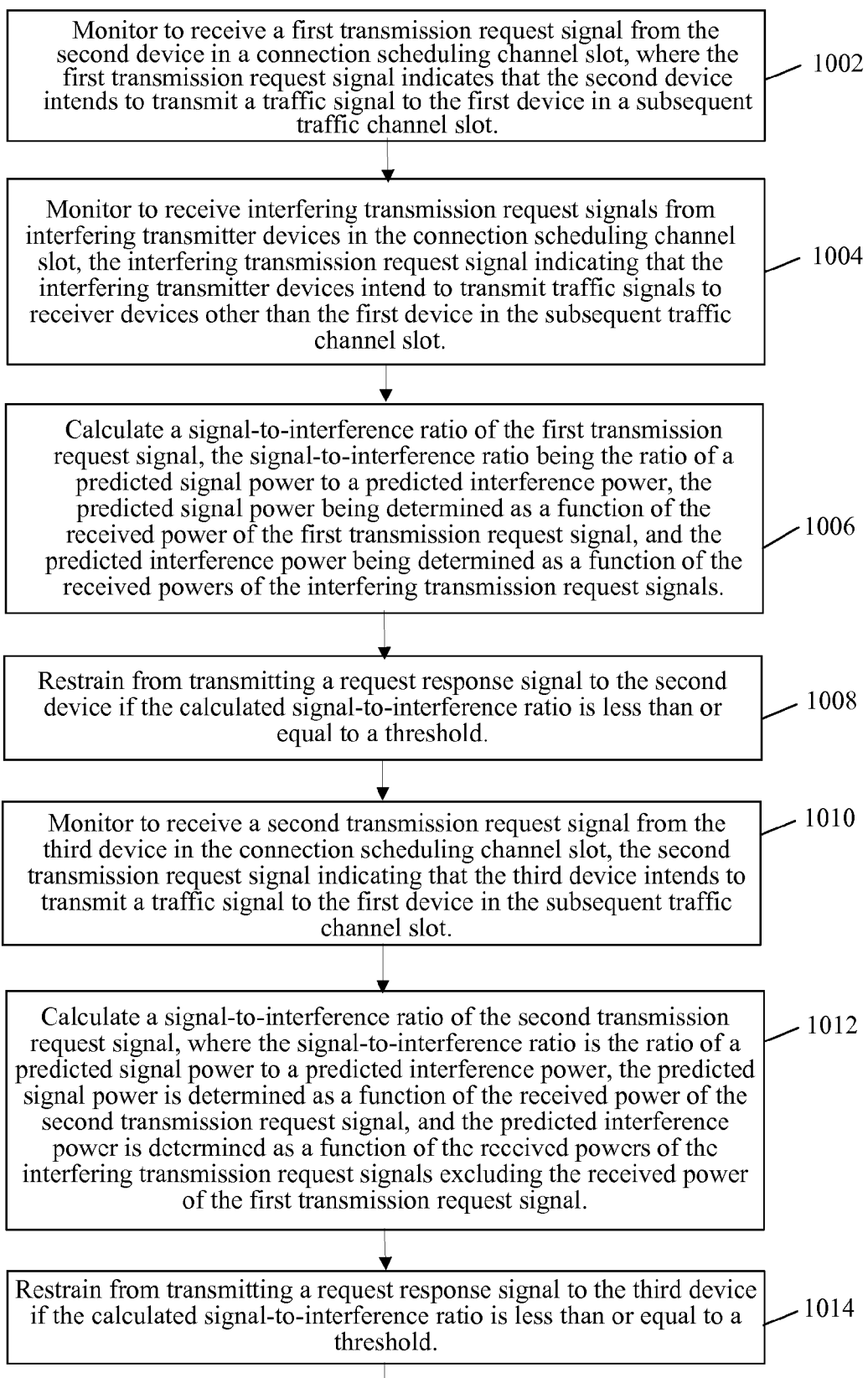
FIG. 10 (comprising FIGS. 10A and 10B) illustrates a method operational in a first device for facilitating communications with a plurality of devices including a second device and a third device within a peer-to-peer network.
Figure 10B:
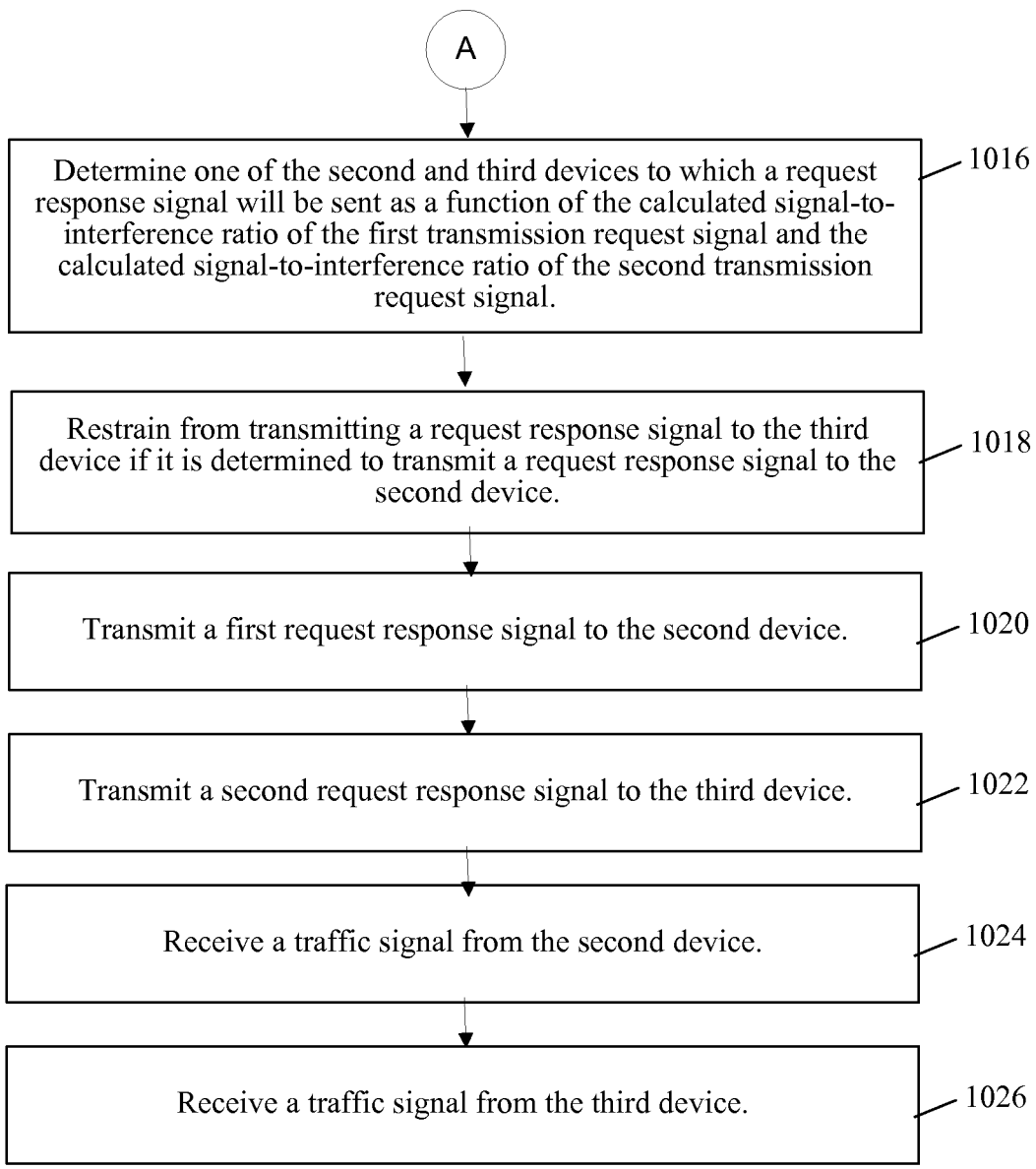

FIG. 10 (comprising FIGS. 10A and 10B) illustrates a method operational in a first device for facilitating communications with a plurality of devices including a second device and a third device within a peer-to-peer network. The first device may have a first connection with the second device and a second connection with the third device. In this example, the first device may be a device capable of maintaining multiple concurrent peer-to-peer connections with other devices in its vicinity. The first device is the target or receiver while the second and third devices are the initiators or transmitters.

The first device monitors (a shared frequency spectrum) to receive a first transmission request signal from the second device in a connection scheduling channel slot, where the first transmission request signal indicates that the second device intends to transmit a traffic signal to the first device in a subsequent traffic channel slot 1002

Similarly, the first device may also monitor to receive interfering transmission request signals from interfering transmitter devices in the connection scheduling channel slot, the interfering transmission request signal indicating that the interfering transmitter devices intend to transmit traffic signals to receiver devices other than the first device in the subsequent traffic channel slot 1004. The first device then calculates a signal-to-interference ratio of the first transmission request signal, where the signal-to-interference ratio is the ratio of a predicted signal power to a predicted interference power, the predicted signal power is determined as a function of the received power of the first transmission request signal, and the predicted interference power is determined as a function of the received powers of the interfering transmission request signals 1006. The first device restrains from transmitting a request response signal to the second device if the calculated signal-to-interference ratio is less than or equal to a threshold 1008.

The first device also monitors (a shared frequency spectrum) to receive a second transmission request signal from the third device in the connection scheduling channel slot, the second transmission request signal indicating that the third device intends to transmit a traffic signal to the first device in the subsequent traffic channel slot 1010.

In one example, the received power of the second transmission request signal may be excluded in the calculation of the predicted interference power when the signal-to-interference ratio of the first transmission request signal is calculated. The first device may then calculate a signal-to-interference ratio of the second transmission request signal, where the signal-to-interference ratio is the ratio of a predicted signal power to a predicted interference power, the predicted signal power is determined as a function of the received power of the second transmission request signal, and the predicted interference power is determined as a function of the received powers of the interfering transmission request signals excluding the received power of the first transmission request signal 1012. The first device restrains from transmitting a request response signal to the third device if the calculated signal-to-interference ratio is less than or equal to a threshold 1014.

The first device may determine one of the second and third devices to which a request response signal will be sent as a function of the calculated signal-to-interference ratio of the first transmission request signal and the calculated signal-to-interference ratio of the second transmission request signal.

The first device may restrain from transmitting a request response signal to the third device if it is determined to transmit a request response signal to the second device 1018. The connection scheduling channel slot may include a plurality of OFDM symbols, where each of the plurality of OFDM symbols includes a plurality of tones, and wherein each of the first and second transmission request signals are transmitted in a tone in one of the plurality of OFDM symbol. The OFDM symbol in which the first transmission request signal is transmitted may be the same as the OFDM symbol in which the second transmission request signal is transmitted.

The first device may transmit a first request response signal to the second device 1020 and transmit a second request response signal to the third device 1022. Each of the first and second request response signals may be transmitted in a tone in one of the plurality of OFDM symbol, where the OFDM symbol in which the first request response signal is transmitted may be the same as the OFDM symbol in which the second request response signal is transmitted.

In one example, the traffic channel slot may include a plurality of OFDM symbols, where each of the plurality of OFDM symbols including a plurality of tones. The first device may partition the traffic channel slot into at least a first and a second subsets of a plurality of tone-symbols, where each of the plurality of tone-symbols being a tone in one OFDM symbol. The first and second subsets may be disjoint or independent from each other. The first device may receive a traffic signal from the second device 1024 in the first subset of tone-symbols. Similarly, the first device may receive a traffic signal from the third device 1026 in the second subset of tone-symbols.

The two subsets of tone-symbols may overlap substantially in time or they may be non-overlapping in time.

Figure 11:
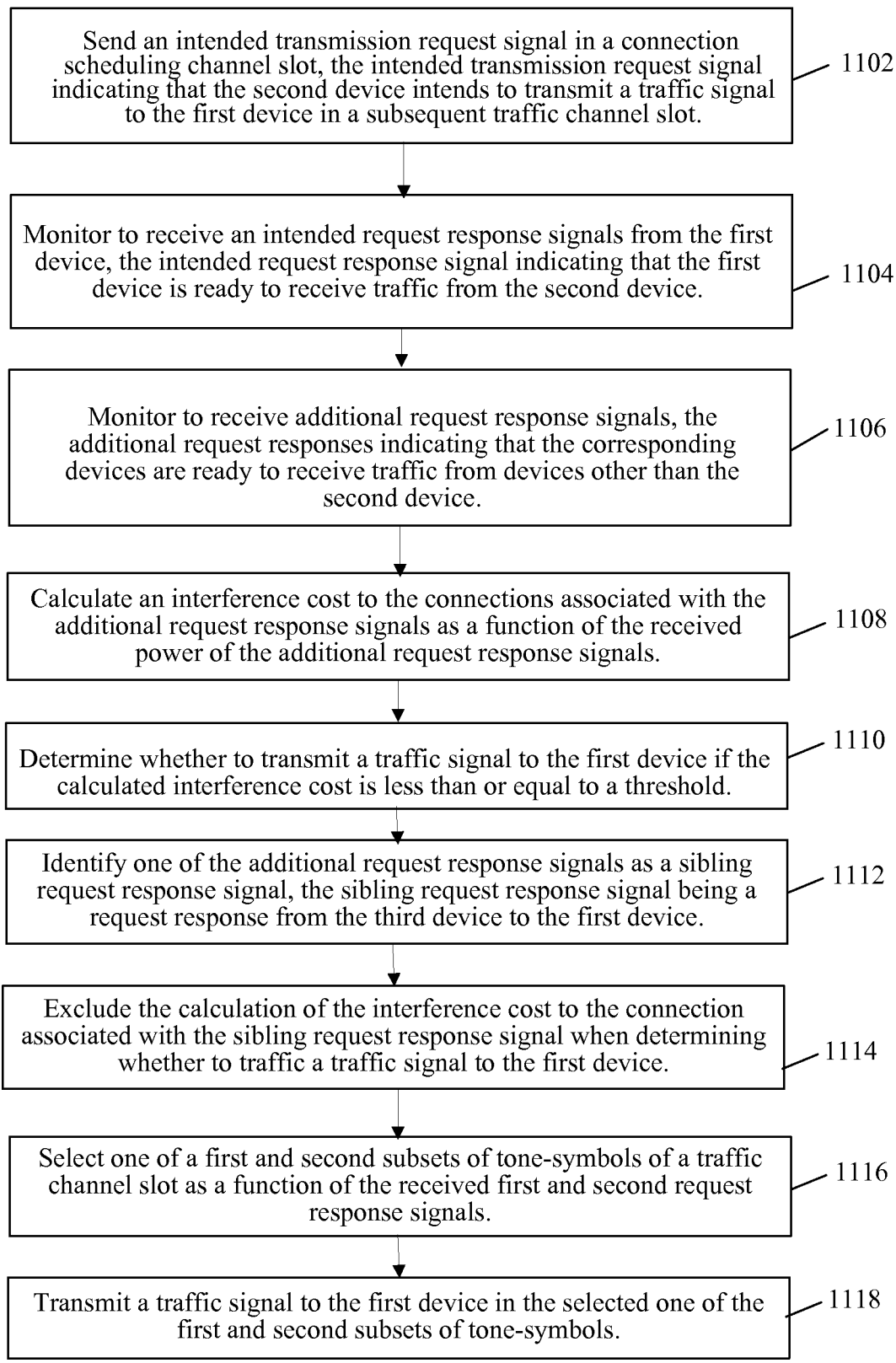
FIG. 11 illustrates a method operational in a second device for facilitating communications with a first device within a peer-to-peer network.

FIG. 11 illustrates a method operational in a second device for facilitating communications with a first device within a peer-to-peer network. The first device may have a first connection with the second device and a second connection with the third device. In this example, the first device may be a device capable of maintaining multiple concurrent peer-to-peer connections with other devices in its vicinity. The first device is the target or receiver while the second and third devices are the initiators or transmitters in the peer-to-peer communications.

The second device may send an intended transmission request signal in a connection scheduling channel slot, the intended transmission request signal indicating that the second device intends to transmit a traffic signal to the first device in a subsequent traffic channel slot 1102. The second device may also monitor (a shared frequency spectrum) to receive an intended request response signals from the first device, the intended request response signal indicating that the first device is ready to receive traffic from the second device 1104. Similarly, the second device may monitor to receive additional request response signals, the additional request responses indicating that the corresponding devices are ready to receive traffic from devices other than the second device 1106. An interference cost may be calculated for the connections associated with the additional request response signals as a function of the received power of the additional request response signals 1108. If the calculated interference cost is less than or equal to a threshold, the second device can determine to transmit a traffic signal to the first device 1110.

The second device may identify one of the additional request response signals as a sibling request response signal, where the sibling request response signal is a request response from the third device to the first device 1112. The calculation of the interference cost to the connection associated with the sibling request response signal can be excluded when determining whether to transmit the traffic signal to the first device 1114.

The connection scheduling channel slot may include a plurality of OFDM symbols, where each of the plurality of OFDM symbols including a plurality of tones, and wherein the intended transmission request signal is transmitted in a tone in one of the plurality of OFDM symbol. Each of the intended and the sibling request response signals may be transmitted in a tone in one of the plurality of OFDM symbol, where the OFDM symbol in which the intended request response signal is transmitted may be the same as the OFDM symbol in which the sibling request response signal is transmitted.

The tone in which the sibling request response signal is transmitted may be known to the second device. The traffic channel slot may include a plurality of OFDM symbols, where each of the plurality of OFDM symbols including a plurality of tones. The second device may partition the traffic channel slot into at least a first and a second subsets of a plurality of tone-symbols, where each of the plurality of tone-symbols is a tone in one OFDM symbol and the first and second subsets are disjoint or independent from each other.

One of the first and second subsets of tone-symbols of the traffic channel slot may be selected as a function of the received first and second request response signals 1116. A traffic signal may be transmitted by the second device to the first device in the selected one of the first and second subsets of tone-symbols 1118. The partition of the traffic channel slot into the first and second subsets may be fixed and known to the second device. The selection of the first and second fixed subsets of tone-symbols from the traffic channel slot may be determined by the tones in which the intended and sibling request response signals are transmitted.

Figure 12:
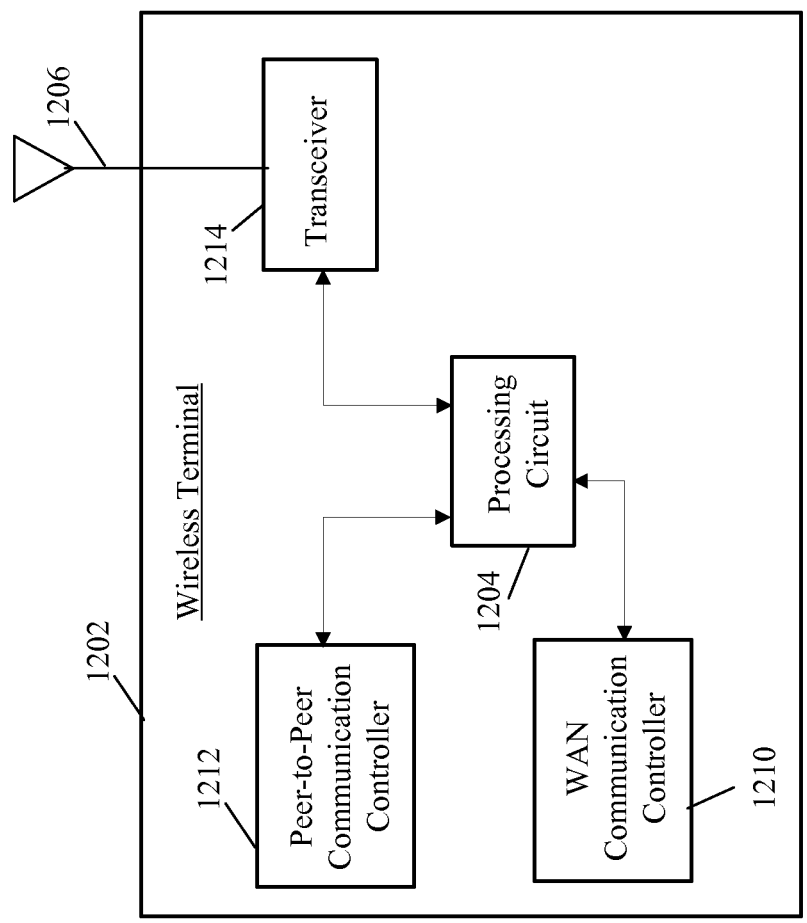
FIG. 12 is a block diagram of a first wireless terminal that may be configured to facilitate peer-to-peer communications with a second wireless terminal over a shared frequency spectrum.

FIG. 12 is a block diagram of a first wireless terminal that may be configured to facilitate peer-to-peer communications with a second wireless terminal over a shared frequency spectrum. The wireless terminal 1202 may include a processing circuit 1204 (e.g., one or more circuits or processors), a peer-to-peer communication controller 1212, a wide area network (WAN) controller 1210 and a transceiver 1214 coupled to at least one antenna 1206. The transceiver 1214 may include a (wireless) transmitter and a (wireless) receiver. The wireless terminal 1202 may communicate via a managed network infrastructure using the WAN communication controller 1210 and/or it may communicate over a peer-to-peer network using the peer-to-peer communication controller 1212. When performing peer-to-peer communications, the first wireless terminal 1202 may be configured to perform one or more of the features illustrated in FIGS. 1-11.

Figure 13:
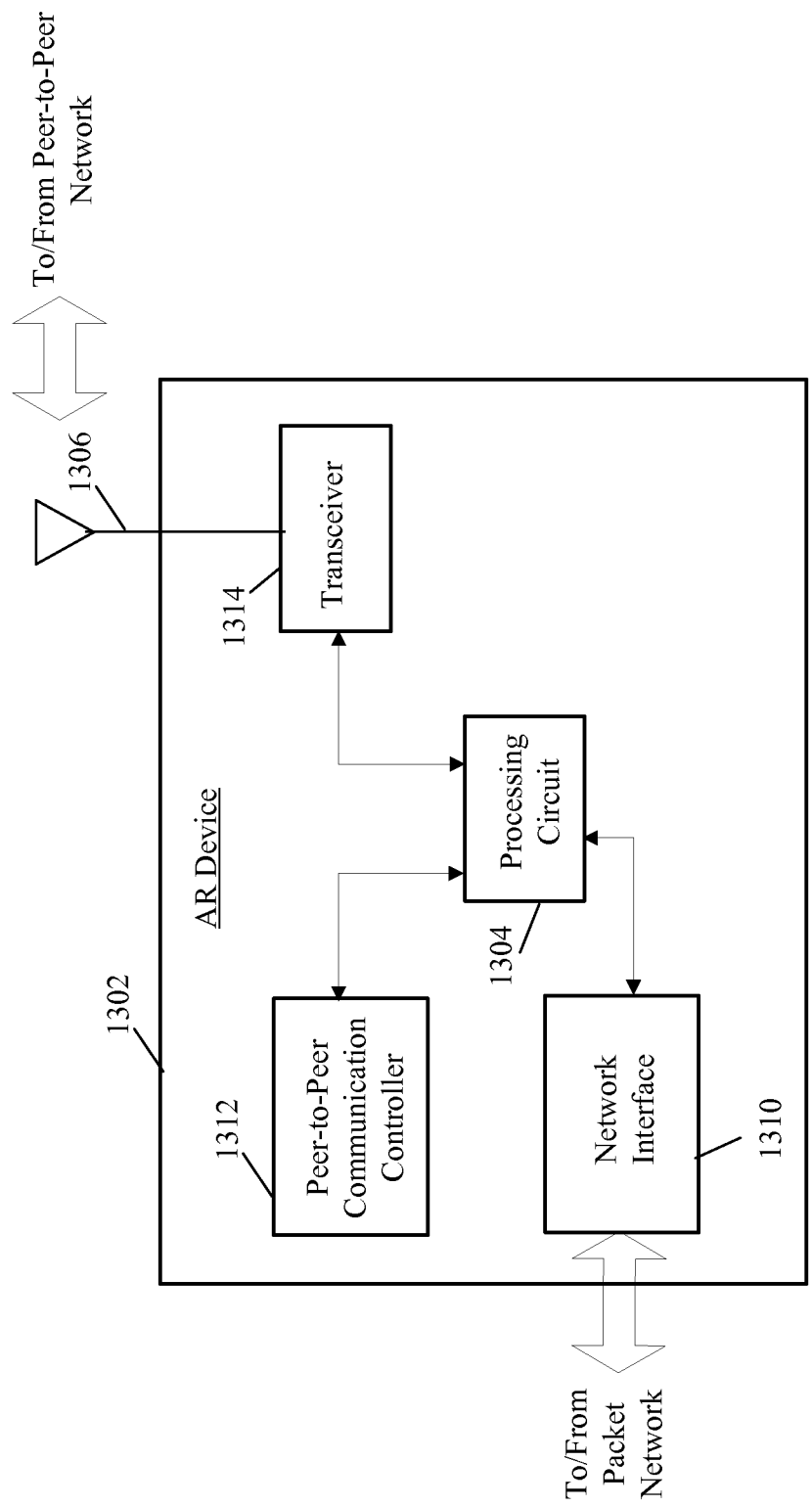
FIG. 13 is a block diagram of device capable of concurrently maintaining multiple peer-to-peer communications with a plurality of wireless terminal over a shared frequency spectrum.

FIG. 13 is a block diagram of device capable of concurrently maintaining multiple peer-to-peer communications with a plurality of wireless terminal over a shared frequency spectrum. The device 1302 may be configured to maintain multiple concurrent peer-to-peer communications over a wireless network. The device 1302 may include a processing circuit (e.g., one or more circuits or processors) 1304, a peer-to-peer communication controller 1312, a network interface 1310 and a transceiver 1314 coupled to at least one antenna 1306. The transceiver 1314 may include a (wireless) transmitter and a (wireless) receiver. The device 1302 may communicate via a packet network via a network interface 1310 and/or it may communicate over a peer-to-peer network using the peer-to-peer communication controller 1312. When performing peer-to-peer communications, the device 1302 may be configured to perform one or more of the features illustrated in FIGS. 1-11.

It will be appreciated that, in accordance with one or more aspects described herein, inferences can be made regarding discovering and identifying peers in a peer-to-peer environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to identifying sources of peer discovery signals in a peer-to-peer network. In accordance with another example, an inference may be made related to estimating a probability of a peer being located within proximity based upon a number of detected signals that match an expected signal format and/or energy levels associated with detected signals. It will be appreciated that the foregoing examples are illustrative in nature and are not intended to limit the number of inferences that can be made or the manner in which such inferences are made in conjunction with the various embodiments and/or methods described herein.

One or more of the components, steps, and/or functions illustrated in FIGS. 1, 2, 3, 4, 5, 6, 7, 8, 9, 10, 11, 12 and/or 13 may be rearranged and/or combined into a single component, step, or function or embodied in several components, steps, or functions. Additional elements, components, steps, and/or functions may also be added. The apparatus, devices, and/or components illustrated in FIGS. 1, 3, 4, 12 and/or 13 may be configured or adapted to perform one or more of the methods, features, or steps described in FIGS. 2, and/or 5-11. The algorithms described herein may be efficiently implemented in software and/or embedded hardware.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, the secondary microphone cover detector may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a first device for facilitating communications with a plurality of devices including a second device and a third device within a peer-to-peer network wherein the first, second, and third devices are peers, the first device having a first connection with the second device and a second connection with the third device, the method comprising:

sending a first transmission request signal in a connection scheduling channel slot, the first transmission request signal indicating that the first device intends to transmit a traffic signal to the second device in a subsequent traffic channel slot; and sending a second transmission request signal in the connection scheduling channel slot, the second transmission request signal being different from the first transmission request signal and indicating that the first device intends to transmit a traffic signal to the third device in the subsequent traffic channel slot;

wherein the connection scheduling channel slot includes a plurality of OFDM symbols, each of the plurality of OFDM symbols including a plurality of tones.

2. The method of claim 1, wherein the first transmission request signal is transmitted in a tone in one of the plurality of OFDM symbols and the second transmission request signal is transmitted in another tone in one of the plurality of OFDM symbols.

3. The method of claim 2, wherein the OFDM symbol in which the first transmission request signal is transmitted is the same as the OFDM symbol in which the second transmission request signal is transmitted.

4. The method of claim 1, further comprising:

monitoring to receive request response signals from the second and from the third device, the request response signals indicating that the corresponding devices are ready to receive traffic from the first device; and determining to transmit a pilot signal if a request response signal is received from at least one of the second and third devices.

5. A method operational in a first device for facilitating communications with a plurality of devices including a second device and a third device within a peer-to-peer network wherein the first, second, and third devices are peers, the first device having a first connection with the second device and a second connection with the third device, the method comprising:

sending a first transmission request signal in a connection scheduling channel slot, the first transmission request signal indicating that the first device intends to transmit a traffic signal to the second device in a subsequent traffic channel slot;

sending a second transmission request signal in the connection scheduling channel slot, the second transmission request signal indicating that the first device intends to transmit a traffic signal to the third device in the subsequent traffic channel slot, wherein the connection scheduling channel slot includes a plurality of OFDM symbols, each of the plurality of OFDM symbols including a plurality of tones;

monitoring to receive request response signals from the second and from the third device, the request response signals indicating that the corresponding devices are ready to receive traffic from the first device;

determining to transmit a pilot signal if a request response signal is received from at least one of the second and third devices;

monitoring to receive additional request response signals, the additional request responses indicating that the corresponding devices are ready to receive traffic from devices other than the first device;

calculating an interference cost to the connections associated with the additional request response signals as a function of the received power of the additional request response signals; and determining to transmit a pilot signal if the calculated interference cost is less than or equal to a threshold.

6. The method of claim 5, further comprising:
transmitting the pilot to both the second and third devices; and
receiving rate report signals from the second and third devices.

7. The method of claim 6, further comprising:
determining to transmit a first and a second traffic signal components to the second and third devices, wherein the transmission rates and powers of the first and second traffic signal components are determined as a function of the received rate report signals;
transmitting the first and second traffic signal components and an in-band control signal in the subsequent traffic channel slot, the in-band control signal including information indicative of the transmission rates.

8. The method of claim 7, wherein the subsequent traffic channel slot includes a plurality of OFDM symbols, each of the plurality of OFDM symbols including a plurality of tones.

9. The method of claim 8, wherein the first and second traffic signal components are transmitted in two disjoint subsets of a plurality of tone-symbols within the traffic channel slot, each of the plurality of tone-symbols being a tone in one OFDM symbol.

10. The method of claim 9, wherein the two subsets overlap substantially in time.

11. The method of claim 9, wherein the two subsets are non-overlapping in time.

12. The method of claim 9, wherein the in-band control signal includes information indicating that the first and the second traffic signal components are transmitted using the two subsets and assignment information of which one of the two subsets is used for which one of the first and the second connections.

13. The method of claim 8, wherein the first traffic signal component is superposed on the second traffic signal component to form the traffic signal transmitted in the traffic channel slot.

14. The method of claim 6, further comprising:
determining to transmit a traffic signal to one of the second and third devices if only one request response signal is received from one of the second and third devices, wherein the rate of the traffic signal is determined as a function of the received rate report signal.

15. The method of claim 6, further comprising:
deciding to transmit a traffic signal to only one of the second and third devices, as a function of the received rate report signals, subsequent to receiving request response signals from both the second and third devices.

16. A first device configured to facilitate communications with a plurality of devices including a second device and a third device within a peer-to-peer network wherein the first, second, and third devices are peers, the first device having a first connection with the second device and a second connection with the third device, comprising:
a transmitter and receiver for establishing a wireless peer-to-peer communication connection with the second and third devices; and
a processing circuit coupled to the transmitter and receiver, wherein the processing circuit is adapted to:
send a first transmission request signal in a connection scheduling channel slot, the first transmission request signal indicating that the first device intends to transmit a traffic signal to the second device in a subsequent traffic channel slot; and
send a second transmission request signal in the connection scheduling channel slot, the second transmission request signal being different from the first transmission request signal and indicating that the first device intends to transmit a traffic signal to the third device in the subsequent traffic channel slot;
wherein the connection scheduling channel slot includes a plurality of OFDM symbols, each of the plurality of OFDM symbols including a plurality of tones.

17. The first device of claim 16, wherein the first transmission request signal is transmitted in a tone in one of the plurality of OFDM symbols and the second transmission request signal is transmitted in another tone in one of the plurality of OFDM symbols.

18. The first device of claim 17, wherein the OFDM symbol in which the first transmission request signal is transmitted is the same as the OFDM symbol in which the second transmission request signal is transmitted.

19. The first device of claim 16, wherein the processing circuit is adapted to:
monitor to receive request response signals from the second and from the third device, the request response signals indicating that the corresponding devices are ready to receive traffic from the first device; and
determine to transmit a pilot signal if a request response signal is received from at least one of the second and third devices.

20. A first device configured to facilitate communications with a plurality of devices including a second device and a third device within a peer-to-peer network wherein the first, second, and third devices are peers, the first device having a first connection with the second device and a second connection with the third device, comprising:
a transmitter and receiver for establishing a wireless peer-to-peer communication connection with the second and third devices;
a processing circuit coupled to the transmitter and receiver, wherein the processing circuit is adapted to:
send a first transmission request signal in a connection scheduling channel slot, the first transmission request signal indicating that the first device intends to transmit a traffic signal to the second device in a subsequent traffic channel slot;
send a second transmission request signal in the connection scheduling channel slot, the second transmission request signal indicating that the first device intends to transmit a traffic signal to the third device in the subsequent traffic channel slot;

wherein the connection scheduling channel slot includes a plurality of OFDM symbols, each of the plurality of OFDM symbols including a plurality of tones;
monitor to receive request response signals from the second and from the third device, the request response signals indicating that the corresponding devices are ready to receive traffic from the first device;
determine to transmit a pilot signal if a request response signal is received from at least one of the second and third devices;
monitor to receive additional request response signals, the additional request responses indicating that the corresponding devices are ready to receive traffic from devices other than the first device;
calculate an interference cost to the connections associated with the additional request response signals as a function of the received power of the additional request response signals; and
determine to transmit a pilot signal if the calculated interference cost is less than or equal to a threshold.

21. The first device of claim 20, wherein the processing circuit is adapted to:
transmit the pilot to both the second and third devices;
receive rate report signals from the second and third devices;
determine to transmit a first and a second traffic signal components to the second and third devices, wherein the transmission rates and powers of the first and second traffic signal components are determined as a function of the received rate report signals;
transmit the first and second traffic signal components and an in-band control signal in the subsequent traffic channel slot, the in-band control signal including information indicative of the transmission rates.

22. A first device configured to facilitate communications with a plurality of devices including a second device and a third device within a peer-to-peer network wherein the first, second, and third devices are peers, the first device having a first connection with the second device and a second connection with the third device, comprising:
means for sending a first transmission request signal in a connection scheduling channel slot, the first transmission request signal indicating that the first device intends to transmit a traffic signal to the second device in a subsequent traffic channel slot; and
means for sending a second transmission request signal in the connection scheduling channel slot, the second transmission request signal indicating that the first device intends to transmit a traffic signal to the third device in the subsequent traffic channel slot;
wherein the connection scheduling channel slot includes a plurality of OFDM symbols, each of the plurality of OFDM symbols including a plurality of tones.

23. The first device of claim 22, further comprising:
means for monitoring to receive request response signals from the second and from the third device, the request response signals indicating that the corresponding devices are ready to receive traffic from the first device;
means for monitoring to receive additional request response signals, the additional request responses indicating that the corresponding devices are ready to receive traffic from devices other than the first device;
means for calculating an interference cost to the connections associated with the additional request response signals as a function of the received power of the additional request response signals; and
means for determining to transmit a pilot signal if the calculated interference cost is less than or equal to a threshold.

24. The first device of claim 23, further comprising:
means for transmitting the pilot to both the second and third devices;
means for receiving rate report signals from the second and third devices;
means for determining to transmit a first and a second traffic signal components to the second and third devices, wherein the transmission rates and powers of the first and second traffic signal components are determined as a function of the received rate report signals; and
means for transmitting the first and second traffic signal components and an in-band control signal in the subsequent traffic channel slot, the in-band control signal including information indicative of the transmission rates.

25. A circuit for facilitating communications over a peer-to-peer network, wherein the circuit operates in a first device to facilitate communications with a plurality of devices including a second device and a third device within the peer-to-peer network wherein the first, second, and third devices are peers, the first device having a first connection with the second device and a second connection with the third device, comprising:
transmit the pilot to both the second and third devices;
receive rate report signals from the second and third devices;
determine to transmit a first and a second traffic signal components to the second and third devices, wherein the transmission rates and powers of the first and second traffic signal components are determined as a function of the received rate report signals; and
transmit the first and second traffic signal components and an in-band control signal in the subsequent traffic channel slot, the in-band control signal including information indicative of the transmission rates.

26. A non-transitory machine-readable medium comprising instructions for a first device to facilitate communications with a plurality of devices including a second device and a third device within the peer-to-peer network wherein the first, second, and third devices are peers, the first device having a first connection with the second device and a second connection with the third device, which when executed by a processor causes the processor to:
transmit the pilot to both the second and third devices;
receive rate report signals from the second and third devices;
determine to transmit a first and a second traffic signal components to the second and third devices, wherein the transmission rates and powers of the first and second traffic signal components are determined as a function of the received rate report signals; and
transmit the first and second traffic signal components and an in-band control signal in the subsequent traffic channel slot, the in-band control signal including information indicative of the transmission rates.

27. A method of operating a second device for facilitating communications with a first device within a peer-to-peer network, the first device having a first connection with the second device and a second connection with a third device, the method comprising:
monitoring to receive an intended transmission request signal from the first device in a connection scheduling channel slot, the intended transmission request signal indicating that the first device intends to transmit a traffic signal to the second device in a subsequent traffic channel slot;

monitoring to receive additional transmission request signals from transmitter devices in the connection scheduling channel slot, the additional transmission request signal indicating that the transmitter devices intend to transmit traffic signals to receiver devices other than the second device in the subsequent traffic channel slot;

calculating a signal-to-interference ratio, the signal-to-interference ratio being the ratio of a predicted signal power to a predicted interference power, the predicted signal power being determined as a function of the received power of the transmission request signal from the first device, and the predicted interference power being determined as a function of the received powers of the additional transmission request signals; and determining to transmit a request response signal to the first device if the signal-to-interference ratio is greater than or equal to a threshold.

28. The method of claim 27, further comprising:

identifying one of the additional transmission request signals as a sibling transmission request signal, the sibling transmission request signal being a request from the first device to the third device; and excluding the received power of the identified sibling transmission request signal in the calculation of the predicted interference power.

29. The method of claim 28, wherein the connection scheduling channel slot includes a plurality of OFDM symbols, each of the plurality of OFDM symbols including a plurality of tones, and wherein the intended transmission request signal is transmitted in a tone in one of the plurality of OFDM symbol and the sibling transmission request signal is transmitted in a tone in one of the plurality of OFDM symbol.

30. The method of claim 29, wherein the OFDM symbol in which the intended transmission request signal is transmitted is the same as the OFDM symbol in which the sibling transmission request signal is transmitted.

31. The method of claim 30, wherein the tone in which the sibling transmission request signal is transmitted is known to the second device.

32. The method of claim 29, further comprising:

transmitting the request response signal, wherein the request response signal is transmitted in a tone in one of the plurality of OFDM symbol.

33. The method of claim 28, further comprising:

receiving a pilot from the first devices;

calculating the signal-to-interference ratio of the pilot;

determining a maximum traffic transmission rate as a function of the calculated signal-to-interference ratio of the pilot, the maximum traffic transmission rate being the maximum rate the second device can reliably receive given the calculated signal-to-interference ratio of the pilot, and transmitting a rate report signal to the first device, the rate report signal including information indicative of the determined maximum traffic transmission rate.

34. The method of claim 33, further comprising:

receiving a traffic signal from the first devices, the traffic signal including an in-band control signal;

determining from the in-band control signal whether the traffic signal includes a traffic signal component targeted to the second device; and decoding the traffic signal component targeted to the second device if it is determined that there is one.

35. The method of claim 34, wherein the in-band control signal includes information indicating that the traffic channel slot is partitioned into at least two disjoint subsets of a plurality of tone-symbols within the traffic channel slot, each of the plurality of tone-symbols being a tone in one OFDM symbol, and the assignment information of which one of the at least two disjoint subsets is assigned to transmit the traffic signal component targeted to the second device, the method further comprising:

retrieving modulation symbols from the assigned subset of tone-symbols; and decoding the traffic signal component targeted to the second device from the retrieved modulation symbols.

36. A second device configured to facilitate communications with a first device within a peer-to-peer network, the first device having a first connection with the second device and a second connection with a third device, comprising:

a transmitter and receiver for establishing a wireless peer-to-peer communication connection with the first and third devices;

a processing circuit coupled to the transmitter and receiver, wherein the processing circuit is adapted to:

monitor to receive an intended transmission request signal from the first device in a connection scheduling channel slot, the intended transmission request signal indicating that the first device intends to transmit a traffic signal to the second device in a subsequent traffic channel slot;

monitor to receive additional transmission request signals from transmitter devices in the connection scheduling channel slot, the additional transmission request signal indicating that the transmitter devices intend to transmit traffic signals to receiver devices other than the second device in the subsequent traffic channel slot;

calculate a signal-to-interference ratio, the signal-to-interference ratio being the ratio of a predicted signal power to a predicted interference power, the predicted signal power being determined as a function of the received power of the transmission request signal from the first device, and the predicted interference power being determined as a function of the received powers of the additional transmission request signals; and determine to transmit a request response signal to the first device if the signal-to-interference ratio is greater than or equal to a threshold.

37. The second device of claim 36, wherein the processing circuit is adapted to:

identify one of the additional transmission request signals as a sibling transmission request signal, the sibling transmission request signal being a request from the first device to the third device; and exclude the received power of the identified sibling transmission request signal in the calculation of the predicted interference power.

38. A second device configured to facilitate communications with a first device within a peer-to-peer network, the first device having a first connection with the second device and a second connection with a third device, comprising:

means for monitoring to receive an intended transmission request signal from the first device in a connection scheduling channel slot, the intended transmission request signal indicating that the first device intends to transmit a traffic signal to the second device in a subsequent traffic channel slot;

means for monitoring to receive additional transmission request signals from transmitter devices in the connection scheduling channel slot, the additional transmission request signal indicating that the transmitter devices intend to transmit traffic signals to receiver devices other than the second device in the subsequent traffic channel slot;

means for calculating a signal-to-interference ratio, the signal-to-interference ratio being the ratio of a predicted signal power to a predicted interference power, the predicted signal power being determined as a function of the received power of the transmission request signal from the first device, and the predicted interference power being determined as a function of the received powers of the additional transmission request signals; and means for determining to transmit a request response signal to the first device if the signal-to-interference ratio is greater than or equal to a threshold.

39. A circuit for facilitating communications over a peer-to-peer network, wherein the circuit operates in a second device to facilitate communications with a first device having a first connection with the second device and a second connection with a third device, comprising:

monitor to receive an intended transmission request signal from the first device in a connection scheduling channel slot, the intended transmission request signal indicating that the first device intends to transmit a traffic signal to the second device in a subsequent traffic channel slot;

monitor to receive additional transmission request signals from transmitter devices in the connection scheduling channel slot, the additional transmission request signal indicating that the transmitter devices intend to transmit traffic signals to receiver devices other than the second device in the subsequent traffic channel slot;

calculate a signal-to-interference ratio, the signal-to-interference ratio being the ratio of a predicted signal power to a predicted interference power, the predicted signal power being determined as a function of the received power of the transmission request signal from the first device, and the predicted interference power being determined as a function of the received powers of the additional transmission request signals; and determine to transmit a request response signal to the first device if the signal-to-interference ratio is greater than or equal to a threshold.

40. A non-transitory machine-readable medium comprising instructions for a second device to facilitate communications with a first device having a first connection with the second device and a second connection with a third device, which when executed by a processor causes the processor to:

monitor to receive an intended transmission request signal from the first device in a connection scheduling channel slot, the intended transmission request signal indicating that the first device intends to transmit a traffic signal to the second device in a subsequent traffic channel slot;

monitor to receive additional transmission request signals from transmitter devices in the connection scheduling channel slot, the additional transmission request signal indicating that the transmitter devices intend to transmit traffic signals to receiver devices other than the second device in the subsequent traffic channel slot;

calculate a signal-to-interference ratio, the signal-to-interference ratio being the ratio of a predicted signal power to a predicted interference power, the predicted signal power being determined as a function of the received power of the transmission request signal from the first device, and the predicted interference power being determined as a function of the received powers of the additional transmission request signals; and determine to transmit a request response signal to the first device if the signal-to-interference ratio is greater than or equal to a threshold.

* * * * *